(12) United States Patent
Sikes

(10) Patent No.: US 9,758,395 B2
(45) Date of Patent: Sep. 12, 2017

(54) LYSINE-BASED POLYMER COAGULANTS FOR USE IN CLARIFICATION OF PROCESS WATERS

(75) Inventor: C. Steven Sikes, Eugene, OR (US)

(73) Assignee: Aquero Company, LLC, Eugene, OR (US)

( * ) Notice: Subject to any disclaimer, the term of this patent is extended or adjusted under 35 U.S.C. 154(b) by 688 days.

(21) Appl. No.: 14/113,645

(22) PCT Filed: Apr. 28, 2011

(86) PCT No.: PCT/US2011/034311
§ 371 (c)(1),
(2), (4) Date: Mar. 10, 2014

(87) PCT Pub. No.: WO2012/148397
PCT Pub. Date: Nov. 1, 2012

(65) Prior Publication Data
US 2014/0166586 A1   Jun. 19, 2014

(51) Int. Cl.
*B01D 21/01* (2006.01)
*C02F 1/52* (2006.01)
*C08L 77/00* (2006.01)
*C08G 69/10* (2006.01)
*C08G 69/26* (2006.01)
*C08L 77/04* (2006.01)
*C02F 1/56* (2006.01)
(Continued)

(52) U.S. Cl.
CPC ............ *C02F 1/5272* (2013.01); *C02F 1/56* (2013.01); *C08G 69/10* (2013.01); *C08L 77/04* (2013.01); *C08L 3/02* (2013.01); *C08L 33/26* (2013.01); *C08L 79/02* (2013.01); *C08L 2205/03* (2013.01)

(58) Field of Classification Search
CPC .. C08L 3/02; C08L 33/26; C08L 79/02; C08L 2205/03

See application file for complete search history.

(56) References Cited

U.S. PATENT DOCUMENTS 3,502,575 A   3/1970   Hepp
3,541,009 A   11/1970   Arendt et al.
(Continued)

FOREIGN PATENT DOCUMENTS

CA   2204087   11/1997
JP   2001129310   5/2001
(Continued)

OTHER PUBLICATIONS

The International Search Report and Written Opinion for Corresponding International Application No. PCT/US2011/034311, mailed Mar. 26, 2012, (17 pages).
(Continued)

*Primary Examiner* — Clare Perrin
(74) *Attorney, Agent, or Firm* — MBM Intellectual Property Law

(57) ABSTRACT

Lysine-based polymers, particularly copolymers of lysine and maleic acid, are useful as coagulants for clarification of wastewaters, including produced waters from oils sands mining operations. They can be advantageously used in combination with commercial coagulants, and in combination with flocculants. Such combinations may include dry blends. Also described are methods of preparation of lysine homopolymers and copolymers.

16 Claims, 4 Drawing Sheets

SAGD Produced
Water
Untreated

Coagulation by
lysine:maleic
copolymer

Flocculation of
coagulated
particulates

(51) Int. Cl.
- *B03D 3/00* (2006.01)
- *C08F 283/04* (2006.01)
- *C08G 69/48* (2006.01)
- *C08L 3/02* (2006.01)
- *C08L 33/26* (2006.01)
- *C08L 79/02* (2006.01)

(56) References Cited

U.S. PATENT DOCUMENTS

| | | |
|---|---|---|
| 3,633,310 A | 1/1972 | Sandiford |
| 3,705,467 A | 12/1972 | McKnight |
| 3,873,487 A | 3/1975 | Minato et al. |
| 3,875,054 A | 4/1975 | Hunt et al. |
| 3,932,282 A | 1/1976 | Ettelt |
| 3,981,100 A | 9/1976 | Weaver et al. |
| 4,066,495 A | 1/1978 | Voigt et al. |
| 4,071,447 A | 1/1978 | Ramirez |
| 4,105,824 A | 8/1978 | Monte |
| 4,120,815 A | 10/1978 | Raman |
| 4,214,987 A | 7/1980 | Clemens |
| 4,330,407 A | 5/1982 | Shermer et al. |
| 4,330,409 A | 5/1982 | Yong et al. |
| 4,382,853 A | 5/1983 | McCoy |
| 4,405,015 A | 9/1983 | McCoy et al. |
| 4,457,371 A | 7/1984 | McCoy et al. |
| 4,600,501 A | 7/1986 | Poirier |
| 4,673,511 A | 6/1987 | Richardson et al. |
| 4,699,951 A | 10/1987 | Allenson et al. |
| 4,705,825 A | 11/1987 | Symes et al. |
| 4,734,205 A | 3/1988 | Jacques et al. |
| 4,738,784 A | 4/1988 | Sugihara |
| 4,741,835 A | 5/1988 | Jacques et al. |
| 4,797,145 A | 1/1989 | Wallace |
| 5,128,046 A | 7/1992 | Marble et al. |
| 5,178,774 A | 1/1993 | Payne et al. |
| 5,330,656 A | 7/1994 | Hassick |
| 5,408,029 A * | 4/1995 | Wood ............ A61K 8/88 525/419 |
| 5,451,328 A | 9/1995 | Bottero et al. |
| 5,593,947 A | 1/1997 | Kinnersley et al. |
| 5,659,998 A | 8/1997 | Salestrom |
| 5,693,222 A | 12/1997 | Galvan et al. |
| 5,730,882 A | 3/1998 | Gallup et al. |
| 5,861,356 A | 1/1999 | Koskan et al. |
| 5,928,474 A | 7/1999 | Moffett |
| 6,034,204 A * | 3/2000 | Mohr ............ C08G 69/10 528/288 |
| 6,042,732 A | 3/2000 | Jankowski et al. |
| 6,048,438 A | 4/2000 | Rosencrance et al. |
| 6,214,786 B1 * | 4/2001 | Randall ............ C08G 69/10 510/276 |
| 6,217,778 B1 | 4/2001 | Shing et al. |
| 6,238,521 B1 | 5/2001 | Shing et al. |
| 6,307,013 B1 | 10/2001 | Chivers |
| 6,337,023 B1 | 1/2002 | Broussard, Sr. |
| 6,620,317 B2 | 9/2003 | Alviti |
| 6,699,363 B2 | 3/2004 | Moffett |
| 6,803,107 B2 | 10/2004 | Mitchell et al. |
| 6,825,313 B2 | 11/2004 | Sikes |
| 6,884,347 B1 | 4/2005 | Krieger |
| 6,889,471 B2 | 5/2005 | Arnold |
| 6,960,294 B2 | 11/2005 | Arnaud |
| 6,969,750 B2 | 11/2005 | Tanaka et al. |
| 7,077,201 B2 | 7/2006 | Heins |
| 7,160,470 B2 | 1/2007 | Davis et al. |
| 7,183,336 B2 | 2/2007 | Berlin et al. |
| 7,497,954 B2 | 3/2009 | Ivan et al. |
| 7,595,002 B2 | 9/2009 | Sikes et al. |
| 7,595,007 B2 | 9/2009 | Sikes et al. |
| 7,987,297 B2 | 7/2011 | Schwabe et al. |
| 9,321,663 B2 | 4/2016 | Sikes et al. |
| 2002/0058786 A1 | 5/2002 | Chivers |
| 2002/0121484 A1 | 9/2002 | Arai |
| 2004/0006198 A1 * | 1/2004 | Sikes ............ C08G 73/1092 528/322 |
| 2005/0194323 A1 | 9/2005 | Ruth et al. |
| 2008/0058576 A1 | 3/2008 | Shafer |
| 2009/0127205 A1 | 5/2009 | Sikes |
| 2010/0038314 A1 | 2/2010 | Vion |
| 2010/0126926 A1 | 5/2010 | Wiemers |
| 2010/0213405 A1 * | 8/2010 | Wensloff ............ C02F 1/288 252/181 |
| 2011/0195844 A1 * | 8/2011 | Bruchmann ......... A01N 25/10 504/196 |
| 2011/0272362 A1 | 11/2011 | Sikes et al. |
| 2014/0166586 A1 | 6/2014 | Sikes |
| 2015/0259231 A1 | 9/2015 | Webber et al. |

FOREIGN PATENT DOCUMENTS

| | | | |
|---|---|---|---|
| JP | 2001129310 A | 5/2001 | |
| JP | 2007-209890 | 8/2007 | |
| WO | 9821271 | 5/1998 | |
| WO | 2005054300 | 6/2005 | |
| WO | 2007047481 | 4/2007 | |
| WO | 2010011867 | 1/2010 | |
| WO | 2010011867 A1 | 1/2010 | |
| WO | WO 2010011867 A1 * | 1/2010 | ............ C02F 1/56 |
| WO | 2012148397 | 11/2012 | |
| WO | 2014018452 | 1/2014 | |

OTHER PUBLICATIONS

American Society for Testing and Materials, Method D 7066-04, 2004.
United States Environmental Protection Agency (EPA) Method 1664, Revision A, 1999. N-Hexane extractable material (HEM; oil and grease) and silica gel treated n-hexane extractable material (SGT-HEM; non-polar material) by extraction and gravimetry. Cincinnati, Ohio: U.S. EPA National Service Center for Environmental Publications, Doc. No. EPA-821-R-98-002, Feb. 1999, 23 pages.
United States Environmental Protection Agency (EPA) Method 9071A, Revision 1, 1994, Oil and grease extraction method for sludge and sediment samples. U.S. EPA, Sep. 1994, 1-7.
Hans Burkert, Jürgen Hartmann: "Flocculants" In: Ullmann's Encyclopedia of Industrial Chemistry (Jun. 2000), pp. 1-6.
Orts et al., "Biopolymer additives to reduce erosion-induced soil losses during irrigation" Industrial Cops and Products 11 (2000) 19-29.
Orts et al., ACS Symposium Series (2001), 786 (Biopolymers form Polysaccharides and Agroproteins), 102-116.
Lentz et al., Soil Science Society of America Journal, 56(6):P1926-1932 (1992).
Hart, "Chemical Removal of Organic Foulants form Produced Water Recycled as Steam" SPE International Thermal Operations and Heavy Oil Symposium and International Horizonal Well Technology Conference (2002).
Wang et al., "Effects of Chemical Application on Antifouling in Steam—Assisted Gravity Drainage Operations" Energy & Fuels, vol. 19, pp. 1425-1429 (2005).
International Search Report and Written Opinion dated Jan. 28, 2010 (WO 2010/011867).
International Preliminary Report on Patentability dated Jan. 23, 2011 (WO 2010/011867).
International Search Report and Written Opinion dated Nov. 1, 2012 (WO 2012/148397).
International Search Report and Written Opinion dated Dec. 16, 2013 (WO 2014/018452).
Office Action issued Jul. 13, 2015 (CA 2,731,608).
Office Action issued Jan. 28, 2015 (AU 2009273946).
Office Action issued Jun. 14, 2012 (EP 09790780.2).
Office Action issued Aug. 18, 2014 (EP 09790780.2).
Office Action Issued Apr. 14, 2008 (CA 2,595,723).
Office Action Issued Jun. 18, 2010 (CA 2,643,137).
Office Action Issued Apr. 1, 2011 (CA 2,643,137).
Office Action Issued Feb. 28, 2012 (CA 2,643,137).
Office Action issued Jun. 26, 2009 (EP 06825932.4).
Office Action issued Jul. 12, 2010 (EP 06825932.4).

(56) References Cited

OTHER PUBLICATIONS

Office Action issued Nov. 10, 2011 (EP 06825932.4).
Office Action issued Feb. 6, 2014 (EP 06825932.4).
Office Action issued Nov. 18, 2012 (EP 11172873.9).
Office Action issued Jul. 9, 2015 (EP 11172873.9).
Restriction Requirement issued Oct. 23, 2008 (U.S. Pat. No. 7,595,007).
Office Action issued Jan. 9, 2009 (U.S. Pat. No. 7,595,007).
Office Action Issued Nov. 14, 2008 (U.S. Pat. No. 7,595,002).
Restriction Requirement issued Mar. 11, 2011 (US 2009/0127205).
Office Action issued May 17, 2011 (US 2009/0127205).
Office Action issued Nov. 17, 2011 (US 2009/0127205).
Office Action issued May 21, 2012 (US 2009/0127205).
Office Action issued Aug. 29, 2012 (US 2009/0127205).
Office Action issued Mar. 24, 2014 (US 2009/0127205).
Office Action issued Jan. 8, 2015 (US 2009/0127205).
Notice of Allowance issued Jun. 2, 2009 (U.S. Pat. No. 7,595,007).
Notice of Allowance issued Jun. 1, 2009 (U.S. Pat. No. 7,595,002).
Office Action issued Mar. 18, 2015 (U.S. Appl. No. 13/055,432).
Office Action issued Apr. 26, 2016 (CA 2,731,608).
Office Action issued Mar. 1, 2016 (EP 06825932.4).
Office Action issued Mar. 4, 2016 (US 2009/0127205).
Office Action issued Oct. 11, 2016 (US2009/0127205).
Notice of Allowance issued Dec. 24, 2015 (U.S. Appl. No. 13/055,432).
Notice of Allowance issued Jul. 12, 2016 (CA 2,731,608).

* cited by examiner

SAGD Produced Water Untreated Coagulation by lysine:maleic copolymer Flocculation of coagulated particulates

LYSINE-BASED POLYMER COAGULANTS FOR USE IN CLARIFICATION OF PROCESS WATERS

This application is a U.S. National Stage of International Patent Application No. PCT/US2011/034311, filed Apr. 28, 20011, which is hereby incorporated by reference in its entirety.

FIELD OF THE INVENTION

The invention is directed towards lysine-based polymers, their methods of synthesis, and their use in treatment of process waters. In particular, the lysine-based polymers are useful as coagulants for clarification of produced waters in oil recovery operations among other uses.

REFERENCES

Bercovici, D., H. Gaertner, N. S. Puigserver. 1987. Compositions for feeding animals. U.S. Pat. No. 4,701,328.

Campbell, R. L., M. Heidaran, C. A. Spargo, J. H. Wilkins, and P. Haaland. Peptides promoting cell adherence, growth and secretion. U.S. Pat. No. 7,041,506.

Carpenter, M. K. and R. S. Thies. 2009. Use of TGF beta superfamily antagonists to make dopaminergic neurons from embryonic stem cells. U.S. Pat. No. 7,560,281.

Eoff, L. S., E. D. Dalrymple, and B. R. Reddy. 2009. Methods and compositions for reducing the production of water and stimulating hydrocarbon production from a subterranean formation. U.S. Pat. No. 7,589,048.

Eoff, L. S., B. R. Reddy, and J. M. Wilson. 2010. Compositions and methods of stabilizing subterranean formations containing reactive shales. U.S. Pat. No. 7,741,251.

Farokhzad, O. C., J. Sangyong, and R. S. Langer. 2009. Controlled release polymer nanoparticle containing bound nucleic acid ligand for targeting. U.S. Pat. No. 7,550,441.

Harada, K., Thermal Polymerization of Lysine and Copolymerization with Neutral and Acidic Amino Acids. *Bull. Chem. Soc. Japan* 32:1007-8 (1959).

Harmon, A. M., I. R. Harris, A. J. Kihm, S. Mistry, D. J. Messina, A. Seyda, C. Yi, and A. Goslewska. 2009. Soft tissue repair and regeneration using postpartum-derived cells. U.S. Pat. No. 7,560,276.

Heinrich, M. R. et al., The Effect of Time of Heating on the Thermal Polymerization of L-Lysine. *Arch. Biochem. Biophys.* 130:441-448 (1969).

Ishisaki, K. et al., Water-absorbing crosslinked acidic amino acid polymers and their manufacture. JP Kokai 11060728 (1999).

Koskan, L. P., J. P. Kneller, and D. A. Batzel. 1999. Aspartic acid copolymers and their preparation. U.S. Pat. No. RE36,234.

Machida, K. et al., Processes for producing water-absorbing resin. EP Pubn. No. 1142925 (2001).

Meers, P. R., T Shangnuan, D. Cabral-Lilly, P. Ahl, and A. S. Janoff. 2009. Encapsulation of bioactive complexes in liposomes. U.S. Pat. No. 7,491,409.

Meyers, W. E. and L. R. Beck. 1985. Method and device for cell culture growth. U.S. Pat. No. 4,546,083.

Reddy, B. R. 2007. Processes for removing oil from solid wellbore materials and produced water. U.S. Pat. No. 7,192,527.

Sikes, C. Steven. 2006. Preparation of high molecular weight polysuccinimides. U.S. Pat. No. 7,053,170.

Strojny, H. A. and H. C. White. 1965. Method of preparing lysine polymers. U.S. Pat. No. 3,215,684.

Wood, L. L. and G. J. Calton. 1996. Amino acid copolymers of maleic acid. U.S. Pat. No. 5,527,878.

Wood, L. L. and G. J. Calton. 1996. Mixtures of polyamino acids and citrate. U.S. Pat. No. 5,540,863.

Zamora, P. O., R. Tsang, and S. Osaki. 2005. Bioactive coating compositions and methods. U.S. Pat. No. 6,921,811.

BACKGROUND

Lysine and Lysine polymers. Lysine is a versatile, trifunctional amino acid. At physiological pH, lysine has a charge of plus one, having one anionic carboxylate group and two cationic primary amine groups. It is relatively inexpensive and available throughout the world for use mainly as a nitrogen supplement for feeding livestock.

Lysine is produced commercially, via a combination of chemical and enzymatic routes, by several companies. The principal form of commercially provided lysine is the zwitterionic salt with chloride, i.e. lysine HCl. In this form, the carboxylate group of lysine is neutralized as a counterion to one amino group of another lysine molecule, with the other amino group occurring as the chloride salt. Lysine sulfate is also commercially available. In this case, the carboxylic group of the lysine molecule occurs in the acid form, with both amino groups counterionic to sulfate.

Lysine may also be obtained as the zwitterionic free base ($\alpha$ carboxylate as $COO^-$, $\epsilon$ amine as $NH_3^+$, $\alpha$ amine as $NH_2$). This form is also available in small amounts as a monohydrated form, lysine hydrate.

The polylysine structure below shows two residues bonded via an alpha linkage (peptide or amide bond) between the $\alpha$-amino group of one monomer and the $\alpha$-carboxylic group of another.

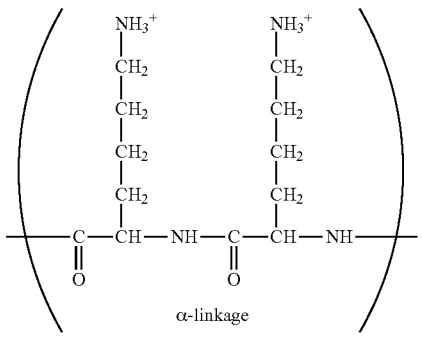

Polylysine is used in biochemical and biomedical research to facilitate cellular attachment; see e.g. Meyers and Beck 1985; Zamora et al. 2005; Campbell et al. 2006. The large body of biomedical literature about polylysine also includes many citations of its utility as a component in drug delivery formulations and controlled release systems (e.g., Carpenter et al. 2009; Farokhzad et al. 2009, Harmon et al. 2009, Meers et al. 2009).

Polylysine has also been proposed for use in a diversity of other applications. For example, it has been shown in earlier studies as potentially superior to monomeric lysine as a feed supplement for livestock (Bercovici et al. 1987); more recently it has been contemplated for use in oil well drilling in thickening compositions for sealing well bores (Eoff et al. 2009, 2010) and for promoting separation of oil from drilling fluids and solids, along with hypochlorite (Reddy 2007).

Access to high molecular weight polylysines, however, has been limited. The microbially-produced product is a poly-ε-lysine of about 30 residues, thus having a molecular weight of about 3,870. The method of production also imposes extra costs as well as practical limitations on commercial quantities that are made.

Thermal polymerization of the zwitterionic free base form of lysine has been used to produce lysine homopolymers and lysine copolymers with other amino acids (Strojny and White, 1965). The products of these experiments exhibited insecticidal, antimicrobial, and fungicidal activities. However, molecular weights (degree of polymerization ~10) and yields were low. Lysine in this form has significant vapor pressure and sublimates to a large extent when heated. Such low molecular weight polymers would be ineffective as coagulants due to their relatively low binding affinity.

Lysine may be polymerized via chemical means, such as the reaction of N-carboxy anhydrides in the presence of initiators such as sodium methylate in solvents (Bercovici et al., 1987). This route has been used for preparing polylysine molecules of varying molecular sizes for research purposes. These are commercially available, generally in small quantities (e.g. from Sigma-Aldrich). However, because the starting N-carboxy anhydrides are generally prepared by phosgenation of the amino acid, this route is problematic from a commercial point of view.

Also described in the prior art are thermally polymerized copolymers, based principally on aspartic acid or related anionic monomers, including maleic acid, which incorporate lysine as a minor component (e.g. Koskan et al. 1999; Wood and Calton 1996a, 1996b; Machida et al. 2001). These copolymers are polyanionic, not polycationic, and they were designed for uses such as dispersants in detergents, antiscalants in boiler water, water-absorbing resins, and other uses unrelated to the field of the present invention.

Coagulants and Clarification of Water Produced in Oilfield Operations. Water is used in oil recovery operations for a variety of reasons. For example, in steam-assisted gravity-drainage (SAGD) operations, it may be injected as superheated steam into the geologic formation to facilitate liquefaction of oily deposits at depth, followed by movement of the pressurized, oily aqueous stream to the surface. Here, the oil is separated from the water. Typical ratios of water to oil in such operations range around 2:1 to 3:1; that is, there often results approximately 2 to 3 barrels of water containing oily residuals per 1 barrel of oil that is recovered.

In principle, the oil may be separated from the water via straightforward techniques, such as flotation and skimming, that take advantage of the differences in the densities of oil and water. However, in practice, the leftover water stream, even after skimming, decanting, and preferential draining, is often dark and oily, owing to the presence of stable emulsions and suspensions of oil and oily solids in the water.

These components are thought to be ionically dispersed in the water as oily micelles having outwardly facing anionic groups, mainly carboxylates, along with some sulfated and phosphated aliphatic, cyclic, and heterocyclic hydrocarbon moieties of complex and heterogeneous composition. In addition to the oily droplets that are thus stably emulsified in the water column, there can be significant components of mineral residuals such as micron-scale particles of sand and clays. Total suspended solids and oils in the range of 1% by weight or more can render the water unusable without further clarification and separation steps.

Ideally, in zero discharge approaches to oil recovery such as SAGD or cyclic steam stimulation (CSS), the water needs to be clarified to acceptable levels so that it can be recycled to the steam generators without fouling and clogging downstream process equipment like organic removal filters and ion exchangers. In larger-scale, open-mining operations, the practice in general is to recycle the clarified and cleansed water to the process, with an eventual goal to return it to some extent to the environment, typically a river, from which it originated.

As exemplified in SAGD and CSS operations, the oil is recovered from an aqueous process stream that is brought to the surface from the depths of the formation, still superheated and under pressure. The process stream is slowed down into very large vessels where the bulk of the oil and water naturally and largely separate, primarily based on their densities. At this stage, chemical additives, such as de-emulsifiers, are typically employed to promote both rate and degree of separation. The oil is removed and sent to pipelines and tankers for transport to upgraders and refineries for further processing.

This removal of the bulk oil leaves behind a stable reverse emulsion of residual oil and oily solids in water, termed produced water. This produced water is cooled via heat exchangers to a temperature in the range of 90° C. so that it can be handled more readily in the downstream process steps that include addition of water clarification chemicals.

The preferred chemical treatment at this step typically has involved injection of a polymeric, polycationic coagulant to disrupt the anionic dispersion and to thus promote coalescence of the oily droplets and solids into small particulates. At this point, the produced water stream so treated moves at high velocity, for example around 8 feet per second in pipes, but it quickly flows next into large skim tanks with low velocity and high residence times (typically several hours). The oil and oily solids that float are removed by skimming. At this point, the water stream has typically cooled to a temperature of about 80° C.

The next step in the process involves an increased rate of flow of the partially clarified produced water into induced flotation devices, where microbubbles are introduced, along with a flocculant. The bubbles are intended to stick to the oily flocculated particulates and make them float, allowing them to be decanted so that the produced water stream can be further clarified. After this process, the stream is directed through organic removal filters so that any residual potential foulants will not reach and interfere with the final steps of silicate removal and ion exchange. The water is then recycled to the steam generator, prior to re-injection into the deep well.

The ion exchange membranes and devices, and the boilers as well, do not tolerate oil and oily residuals and can be easily compromised, if not ruined, by an input of improperly de-oiled water, either suddenly or gradually. This results in downtime, which is very costly in terms of lost production, and may require replacement of ion exchangers as well as other components of the de-oiling line.

In conventional practice, treatment of the oily produced water stream is quite commonly ineffective, resulting in only partially clarified water. Even if the initial treatment does result in coalescence of oily solids and clear partitioning of oily and aqueous phases, the subsequent attempts at removal of residual oil and oily solids is often inefficient.

In addition, even if the water is clarified and properly separated from oily solids, residual treatment chemicals may remain as soluble components of the clarified process stream. Typically, these materials are vinyl polymers that are mainly comprised of acrylamide and quaternized residues. Consequently, they are nondegradable, environmentally persistent, and sometimes considered undesirable from the standpoints of possible harmful biological effects.

To address these problems, the present inventor previously developed a class of biodegradable flocculants that compete well with vinyl flocculants on both cost and performance. See, for example, PCT Pubn. Nos. WO 2007/047481 and WO 2010/011867. These flocculants have been used in combination with conventional coagulants in protocols that quickly and effectively de-oil produced waters, generating a clear aqueous phase and a separated phase of oily solids.

However, heretofore, there have been no biodegradable coagulants for use in treatment of produced water that meet cost/performance requirements. Coagulants typically are polycationic. Some polycations that are based on biological feedstocks are available; these include cationized starches, chitosan, and tannin amines. However, these types of polycations do not perform adequately as coagulants, are too expensive, or both.

SUMMARY

In one aspect, the invention provides a lysine copolymer comprising (i) lysine residues and (ii) residues of a diacid HOOC—R—COOH, where R is a 2- to 4-carbon alkanyl or monoalkenyl chain, wherein the molar ratio of lysine residues to diacid residues in the copolymer, designated m:n, is about 10:1 to 100:1. In selected embodiments, the diacid is selected from maleic acid, fumaric acid, succinic acid, and oxalic acid. In one embodiment, the diacid residues are maleic acid residues.

In selected embodiments, the stated molar ratio m:n is 10:1 to 50:1; in one embodiment, m:n is about 30:1. In preferred embodiments, the copolymer has a molecular weight of at least 20 kDa; in other preferred embodiments, the molecular weight is at least 50 kDa.

Also provided are compositions comprising (a) the above-described lysine copolymer and (b) a polycationic coagulant selected from polyDADMAC, polyEpi/DMA, and combinations thereof; wherein the lysine copolymer has a molecular weight of at least 20 kDa, and wherein the weight ratio of (a):(b) is about 10:1 to about 1:4. In one embodiment, the weight ratio of (a):(b) is about 4:1. The composition may be a dry blend of components (a) and (b). In one embodiment, the lysine copolymer is a lysine:maleic copolymer.

In further embodiments, the composition further comprises (c) a flocculant, wherein the flocculant comprises an acrylamide copolymer having a molecular weight of at least four million Daltons. In selected embodiments, the acrylamide copolymer is a cationic acrylamide copolymer. The flocculant may further comprise a heat-activated or pregelatinized starch having flocculating activity. The composition may be a dry blend of components (a), (b) and (c).

In a further aspect, the invention provides a method of producing coagulation in wastewater containing emulsified and/or suspended oils and/or solids, by treating the wastewater with a coagulant comprising a lysine copolymer as described above, having a molecular weight of at least 20 KDa. Preferably, the copolymer is a lysine:maleic copolymer; that is, the diacid residues in the lysine copolymer are residues of maleic acid. Selected embodiments of the method can employ various embodiments of the lysine copolymer described herein.

In one embodiment of the method, the wastewater comprises produced water from an oil sands mining operation, such as a steam assisted gravity drainage (SAGD), cyclic steam stimulation (CSS), or surface mining operation. In some embodiments, the temperature of the produced water is about 80° C. or higher upon addition of the coagulant.

The coagulant may further comprise, in addition to the lysine copolymer, a further coagulant material selected from polyDADMAC and polyEpi/DMA. In this case, the lysine copolymer and further coagulant material are preferably present in a weight ratio of 1:1 or greater, more preferably 4:1 or greater.

In a preferred embodiment, the method further comprises treating the wastewater with a flocculant, wherein the flocculant comprises an acrylamide copolymer having a molecular weight of at least four million Daltons. In one embodiment, the acrylamide copolymer is a cationic acrylamide copolymer. The flocculant may further comprise a heat-activated or pregelatinized starch having flocculating activity.

In one embodiment of the method, addition of the coagulant is followed by an incubation period of at least 5 seconds prior to treating with flocculant. The incubation period may be at least 30 seconds, at least 5 minutes, or at least 30 minutes. Large scale processes may use longer incubation periods, but shorter periods may also be effective even at large scale.

In another embodiment of the method, the coagulant and flocculant are added simultaneously, as a dry blend of said coagulant and flocculant. The dry blend typically comprises the coagulant and flocculant in a weight ratios of 1:1 to 10:1 coagulant:flocculant; in selected embodiments, the weight ratio is about 4:1.

In still another embodiment of the method, wherein the flocculant is provided as an emulsion, it may be added either together with or immediately preceding the coagulant (preferably by up to 5 minutes, more preferably up to 3 minutes, most preferably up to 1 minute). In this embodiment, the coagulant is typically provided as an aqueous solution. The flocculant emulsion typically comprises a nonaqueous carrier, such as a light oil, and/or a surfactant.

In another aspect, the invention provides a method of preparing a lysine copolymer, the method comprising:

(a) drying, at a temperature of about 60° C. to 120° C., an aqueous mixture of (i) a lysine monomer and (ii) a diacid having the structure HOOC—R—COOH, where R is a 2- to 4-carbon alkanyl or monoalkenyl chain, or an anhydride of such a diacid; and (b) heating the resulting mixture, under vacuum or under a nitrogen atmosphere, at a temperature of about 160° C. to 240° C. for 2 to 24 hours.

In selected embodiments, component (ii) is maleic acid or maleic anhydride. The molar ratio of (i):(ii) is preferably 10:1 to 100:1; in one embodiment, the ration is about 30:1.

The pH of the aqueous mixture in (a) is preferably 2 to 5, and more preferably 3 to 4. Step (b) preferably comprises heating at a temperature of about 220° C. to 225° C. for 5 to 7 hours.

The lysine monomer in (a) can be, for example, lysine zwitterionic free base, lysine hydrochloride, and/or lysine hydrate.

The aqueous mixture in (a) may be prepared by (i) dissolving the lysine monomer in water at a temperature of 60° C. or greater, and (ii) adding said acid or anhydride to the resulting lysine solution. Step (ii) may comprise adding molten maleic anhydride to the lysine solution.

Alternatively, the aqueous mixture in (a) may be prepared by adding an aqueous solution of the diacid to the lysine, with continuous or intermittent agitation. This process is effective to produce a slurry, which is then heated, under vacuum or, more preferably, under a nitrogen atmosphere, at a preferred temperature of about 160° C. to 240° C. for a preferred time of 2 to 24 hours.

The invention also provides a lysine:maleic copolymer prepared by the above-described method. In a preferred embodiment, the molar ratio of components (i):(ii) in step (a) is about 30:1.

In a further aspect, the invention provides a method of preparing a lysine homopolymer, and lysine homopolymers prepared using the method. The method comprises:

(a) adjusting the pH of an aqueous solution of a lysine monomer to 3-4 using phosphoric acid, (b) drying the resulting solution at a temperature of about 60° C. to 120° C.; and (c) heating the resulting mixture, under vacuum or under a nitrogen atmosphere, at a temperature of about 160° C. to 240° C. for 2 to 24 hours.

The lysine monomer in (a) can be, for example, lysine zwitterionic free base, lysine hydrochloride, and/or lysine hydrate. Preferably, the heating of step (c) is done under a nitrogen atmosphere.

In a related aspect, the invention provides a method of producing coagulation in wastewater containing emulsified and/or suspended oils and/or solids, by treating said waste water with a coagulant comprising the above-described lysine homopolymer, wherein the lysine homopolymer has a molecular weight (Mw) of at least 10 kDa.

In one embodiment, the wastewater comprises produced water from an oil sands mining operation, such as a steam assisted gravity drainage (SAGD), cyclic steam stimulation (CSS), or surface mining operation. In some embodiments, the temperature of the produced water is about 80° C. or higher upon addition of the coagulant.

The coagulant may further comprise, in addition to the lysine homopolymer, a further coagulant material selected from polyDADMAC and polyEpi/DMA. In this case, the lysine homopolymer and further coagulant material are preferably present in a weight ratio of 1:1 or greater, more preferably 4:1 or greater.

In a preferred embodiment, the method further comprises treating the wastewater with a flocculant, wherein the flocculant comprises an acrylamide copolymer having a molecular weight of at least four million Daltons. In one embodiment, the acrylamide copolymer is a cationic acrylamide copolymer. The flocculant may further comprise a heat-activated or pregelatinized starch having flocculating activity.

In one embodiment of the method, addition of the coagulant is followed by an incubation period of at least 5 seconds prior to treating with flocculant. The incubation period may be at least 30 seconds, at least 5 minutes, or at least 30 minutes. The incubation period may increase, but does not necessary increase, with the volume scale of the process. That is, large scale processes may use longer incubation periods, but shorter periods may also be effective even at large scale.

In another embodiment of the method, the coagulant and flocculant are added simultaneously as a dry blend of said coagulant and flocculant. The dry blend typically comprises the coagulant and flocculant in a weight ratios of 1:1 to 10:1; in selected embodiments, the weight ratio is about 4:1.

In still another embodiment of the method, wherein the flocculant is provided as an emulsion, it is added either together with or immediately preceding (e.g. by up to 5 minutes, more preferably up to 3 minutes, most preferably up to 1 minute) the coagulant. In this embodiment, the coagulant is typically provided as an aqueous solution, and the flocculant emulsion comprises a nonaqueous carrier, such as a light oil, and/or a surfactant.

The lysine-based coagulants disclosed herein are biodegradable and environmentally benign. Their utility as coagulants is demonstrated herein, and protocols for their use for de-oiling of produced water from oil recovery operations, preferably in combination with flocculants, is described herein.

DETAILED DESCRIPTION

I. Lysine Homopolymers (Polylysine)

Figure 1:
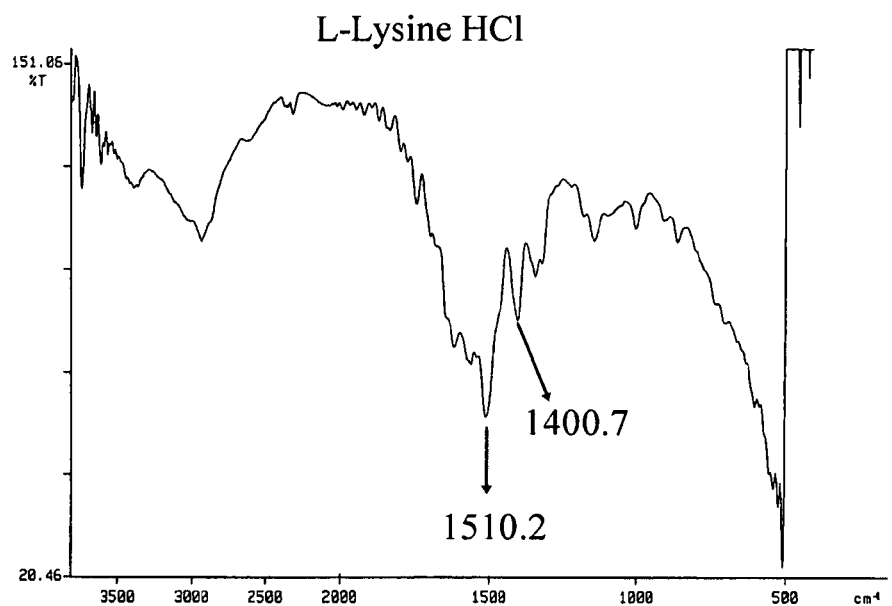
FIG. 1 is the infrared spectrum (FTIR) of lysine HCl, showing a characteristic amine peak at 1510 cm$^{-1}$ and carboxylic peak at 1400 cm$^{-1}$.
Figure 2:
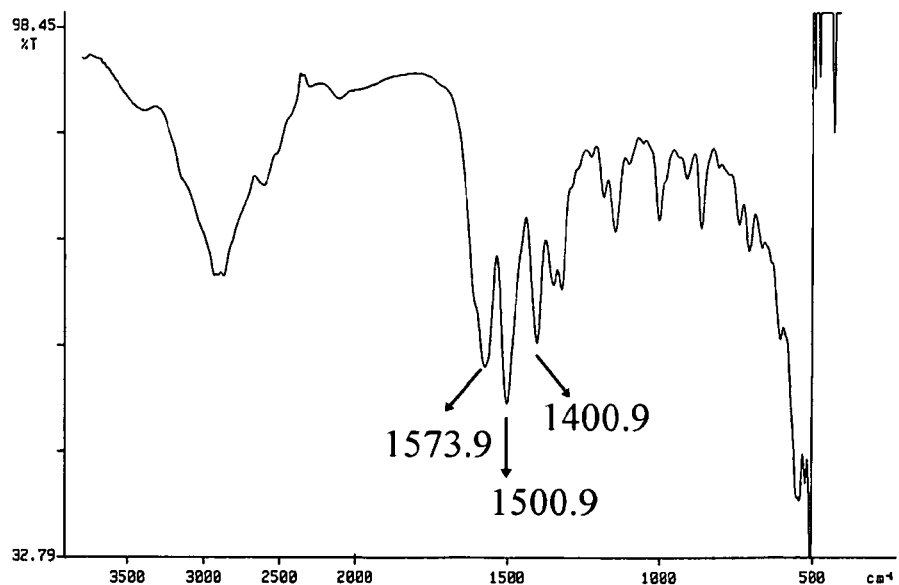
FIG. 2 is the infrared spectrum (FTIR) of a comonomeric composition of lysine HCl and maleic acid/maleate, at a 30:1 molar ratio of lysine:maleic/maleate. Shown are characteristic amine peaks differentiated at lower pH (~3.8) at ~1500 cm$^{-1}$ and 1574 cm$^{-1}$ and the carboxylic peak at 1400 cm$^{-1}$.
Figure 3:
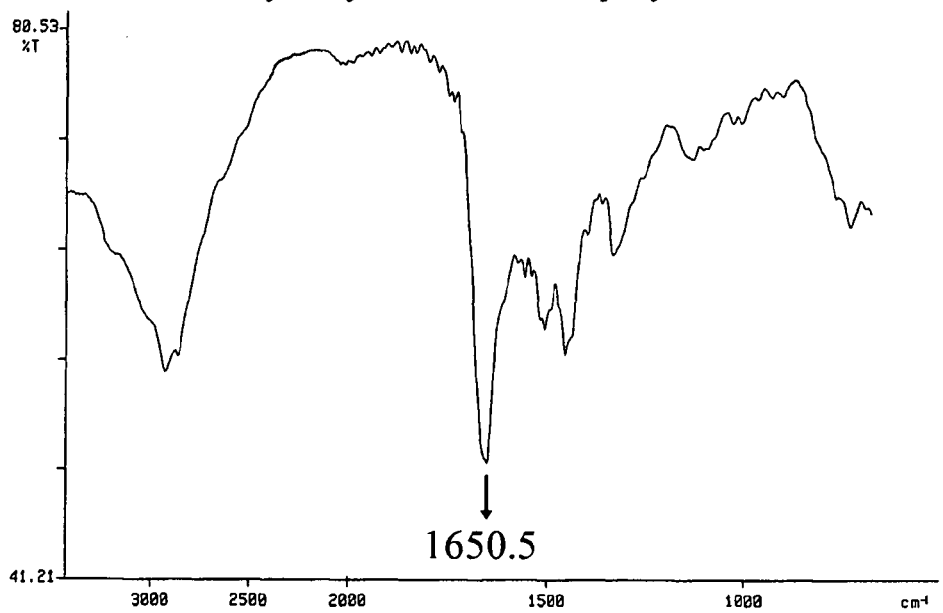
FIG. 3 is the infrared spectrum (FTIR) of the lysine copolymer product of the lysine/maleic comonomer composition of FIG. 2. The prominent, characteristic amide peak of the polypeptide backbone is shown at 1650 cm$^{-1}$.
Figure 4:
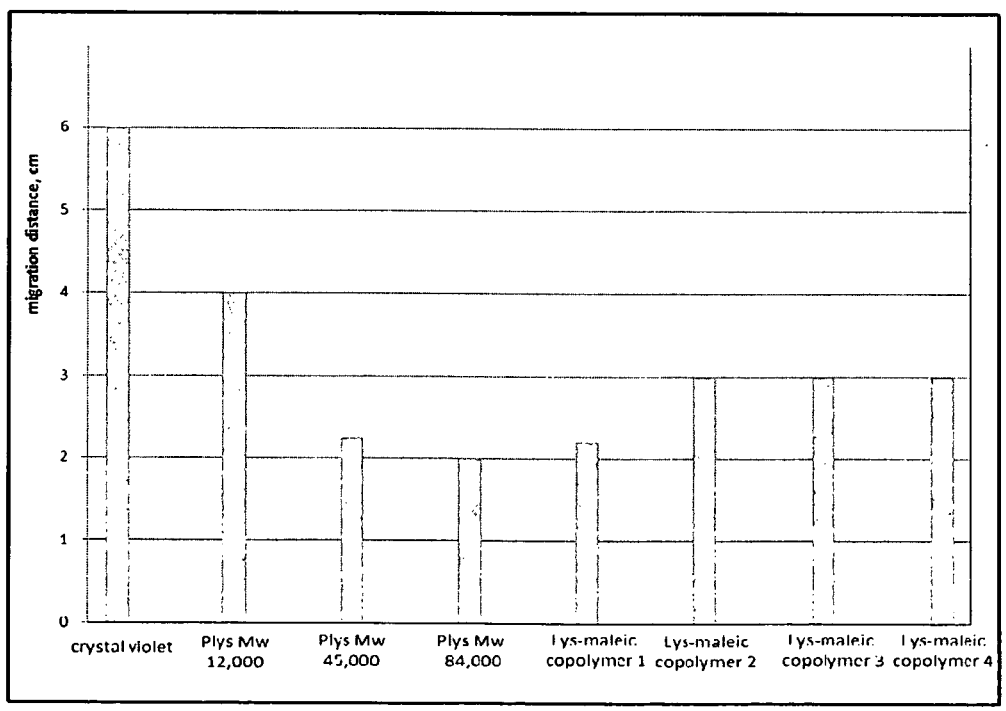
FIG. 4 shows the migration distances of molecular weight standards of polylysine (Sigma Chemical, Mw's assigned by multi-angle laser-light scattering) as compared to those of lysine-maleic copolymers of the present invention. Copolymers 1, 2, 3, and 4 were prepared according to the reaction conditions of Example 6, from a comonomer mixture having a molar ratio of 30:1 of L-lysine HCl and maleic anhydride, polymerized under a stream of nitrogen at 220° C. for 5 h, 3 h, 4 h, and 7 h respectively.

Disclosed herein are improved methods of preparing water soluble, medium to high molecular weight lysine homopolymers, in high yields, by thermal polymerization. These polymers are useful as coagulants in wastewater processing, as described herein.

Conventionally, direct thermal polymerization of dry monomeric zwitterionic lysine salt (lysine free base) has produced polymers of relatively low molecular size and/or very broad molecular weight distribution, which are ineffective as coagulants due to their relatively low binding affinity. In addition, zwitterionic lysine substantially sublimates rather than polymerizes when heated, resulting in low yields of products (see e.g. Heinrich 1969; Harada 1959; Strojny 1965).

Other dry, monomeric forms of lysine polymerize minimally thermally, if at all. These forms include lysine monohydrochloride, lysine dihydrochloride, and lysine hydrate. In the inventor's hands, each of these compounds failed to polymerize when heated from 160° C. to 220° C. for up to 24 hours and thermally decomposed at temperatures above 240° C.

The present inventor found that, by dissolving any of these forms of lysine first in water and adjusting the pH into the range of 3-4 with, for example, phosphoric acid, followed by drying at ≤120° C. and then heating the resultant solid material at 220° C., thermal polymerization produced polylysine products in good yield having moderate to high molecular weights and good activity as coagulants.

In an exemplary procedure, the lysine monomer is dissolved in water, typically at 10% by weight at room temperature, or at higher concentrations at elevated temperatures. (See e.g. FIG. 6; Example 13.) Any of the zwitterionic free base, mono- or dihydrochloride, or hydrate may be used.

While L-lysine is the most commonly available form of the amino acid and is used in most of the examples herein, the procedures described herein may also employ D- or DL-lysine; see e.g. Example 2.

The pH of the solution is then adjusted into the range of 3 to 4, preferably 3 to 3.8, preferably by addition of a mild acid such as phosphoric acid. HCl or acetic acid may also be used, but neither $H_2SO_4$ nor $HNO_3$ is recommended for this purpose.

The aqueous acidic solution is then dried in a forced air oven at 60° C. to 120° C., followed by polymerization at 180° C. to 240° C., preferably 220° C., for 2 to 24 hours, preferably 5 to 7 hours. During the polymerization, a vacuum of e.g. 28-30 inches of Hg may be continuously or intermittently applied to remove both atmospheric oxygen and water of condensation.

Products made under vacuum were obtained in good yield and were effective coagulants, but there was some loss of monomer to sublimation. Alternatively and preferably, a mild stream of nitrogen is supplied, rather than imposition of a vacuum, again to minimize oxygen and to remove water vapor that is produced as the reaction progresses. Sublimation was suppressed when the reactions were run under a nitrogen blanket, yield approached theoretical, and products exhibited good activity as coagulants.

The benefit of aqueous dissolution and pH adjustment as described above was also observed in increased Mw of the products. Products prepared from solutions having a pH in the preferred range of 3 to 4, more preferably 3 to 3.8, had moderately high Mw (10,000 to 20,000) and good coagulation activity, as described in Examples 2, 4, and 5 below.

II. Lysine:Diacid Copolymers

Disclosed herein are certain polycationic, lysine-based copolymers of lysine with a diacid, preferably a short chain diacid, i.e. HOOC—R—COOH where R is a two- to four-carbon, preferably two- or three-carbon, alkanyl or monoalkenyl group. The corresponding anhydrides can generally be used equivalently. Examples include succinic, maleic, glutaric, and adipic acid. In one embodiment, the diacid is maleic acid.

The copolymers are produced via thermal polycondensation of the monomers and can be made inexpensively in commercial quantities. The copolymers are water soluble and have sufficient molecular size and accompanying ionic affinities such that they are highly effective as industrial coagulants. A principal use of the lysine copolymer coagulants is in water treatment, with emphasis herein on oil recovery operations, as discussed above.

The preparation of a preferred lysine-based copolymer of the present invention; i.e. a lysine-maleic copolymer, is shown schematically below. The residue ratio and distribution, molecular size and lysine residue configurations shown in the scheme are exemplary only; these parameters are discussed further below.

(A monomer "residue", as defined herein, is the structural portion of a polymer chain resulting from incorporation of the monomer reagent into the polymer. For example, lysine residues are represented by —(CO—CH((CH$_2$)$_4$NH$_2$)—NH)—, which is an α-linked residue, and —(CO—CH(NH$_2$)—(CH$_2$)$_4$—NH)—, which is an ε-linked residue (where each may be in either possible orientation within a polymer). The residue of a dicarboxylic acid HOOC—R—COOH, in the context of the current disclosure, is the structure —(OC—R—CO)—, where OC and CO are carbonyl groups. For example, a maleic acid (or maleic anhydride) residue has the structure —(OC—CH=CH—CO)—.)

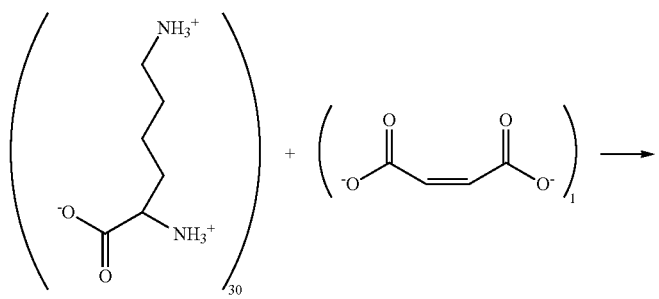

-continued

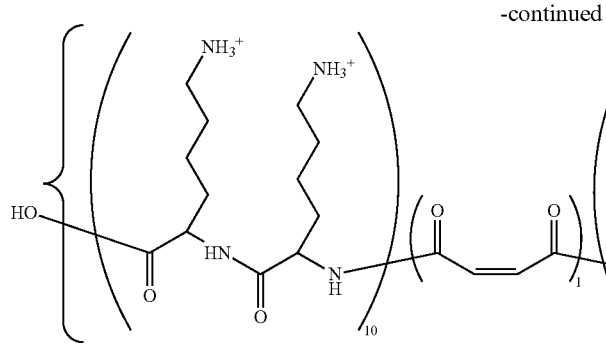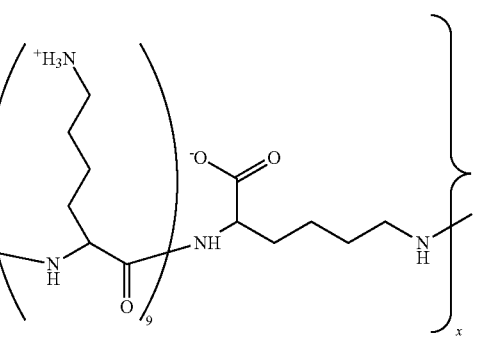

Because the copolymers contain a >1 ratio of lysine to non-lysine residues, the expected structure, as shown above, comprises blocks of varying lengths of lysine residues, whose terminal amino groups form amide bonds with linking maleic (or other diacid) residues. (Some regions of alternating lysine and diacid residues may be present, although they are statistically less likely with higher ratios of lysine to diacid.) With respect to incorporation of the lysine monomer, the copolymers may contain both alpha (the predominant linkage illustrated above) and epsilon linkages (below and terminal linkage above). Chain extension is terminated when there are no more unreacted lysine monomers for incorporation into the polymer.

The copolymers may include branching but preferably have only low amounts of crosslinking, if any. End groups are typically carboxyl and/or amino groups or their salts, depending on pH.

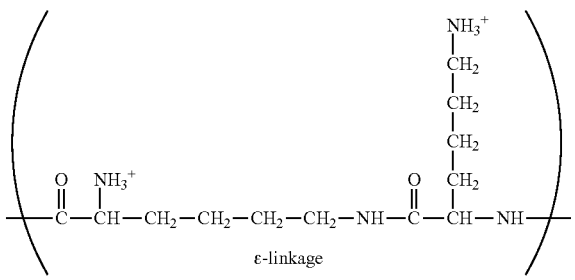

ε-linkage

The ratio of lysine residues to diacid residues, e.g. maleic residues, in the copolymers is typically 100:1 to 10:1, preferably 80:1 to 10:1, more preferably 50:1 to 10:1. In selected embodiments, the ratio is 100:1, 90:1, 80:1, 75:1, 70:1, 60:1, 50:1, 40:1, 35:1, 30:1, 25:1, 20:1, 15:1, or 10:1. In one embodiment, the ratio is about 30:1. (Ratios as stated in this disclosure refer to the reagent comonomer ratios used in preparing the copolymers, which, as noted below, are believed to closely approximate the residue ratios in the copolymers.)

The molecular weight (Mw) of the copolymers is preferably at least 10 KDa, e.g. 10 to 100 KDa, and more preferably at least 20 KDa, e.g. 20 to 100 KDa. In one embodiment, the Mw is 50 to 100 KDa.

III. Preparation of the Lysine:Diacid Copolymers

Copolymerization of lysine with small amounts of maleic acid, maleic anhydride, or other dicarboxylate compounds is accomplished by codissolution of lysine with the comonomer or precursor, followed by pH adjustment, drying, and thermal polymerization, as described further below. It is believed that the dicarboxylate monomers act as chain extenders and/or mild crosslinking agents to increase the Mw of the polymer products. The lysine copolymers so produced were obtained in good yield, had medium to high molecular weights, and exhibited improved activity as coagulants.

A preferred dicarboxylate precursor is an anhydride, particularly maleic anhydride. Addition of the anhydride to a solution of lysine serves to lower the pH of the aqueous solution into the desired range. Thus, the compound acts as a pH adjusting agent as well as a comonomer. Note that the terminology "a copolymer of lysine and maleic (or other) acid" as used herein includes copolymers prepared using maleic (or other) anhydride.

Briefly, the polymerization process comprises:

(a) drying an aqueous mixture of (i) a lysine monomer and (ii) the diacid or diacid anhydride, at a temperature of about 60° C. to 120° C.; and (b) heating the resulting mixture, under vacuum or under a nitrogen atmosphere, at a temperature of about 160° C. to 240° C., for 2 to 24 hours.

Thus, a preferred method comprises (a) drying an aqueous mixture of (i) lysine, preferably as the HCl salt, and (ii) maleic acid or maleic anhydride, at a temperature of about 60° C. to 120° C.; and (b) heating the resulting mixture, under vacuum or under a nitrogen atmosphere, at a temperature of about 160° C. to 240° C. for 2 to 24 hours. Other forms of monomeric lysine, such as the zwitterionic free base or the hydrate, may also be used. As noted above, while L-lysine is the most commonly available form of the amino acid and is used in most of the examples herein, the procedures described herein may also employ D- or DL-lysine.

The aqueous mixture of step (a) is preferably prepared by adding component (ii) to a solution of the lysine in water. Thus, in an exemplary method (see e.g. Example 6), monomeric lysine, preferably lysine HCl, is dissolved in water. The lysine is preferably dissolved up to its solubility limit in water. At room temperature (20-25° C.), lysine HCl may be dissolved up to about 50% by weight. Preferably it is dissolved at 10 to 50% by weight, more preferably at 30 to 50% by weight. (See Example 12.) When the water is heated, the solubility limit of lysine increases significantly. At 60° C., lysine HCl may be dissolved up to about 58% by weight.; at 70° C., to about 60%; at 80° C., to about 62%; at 90° C., to about 64%; and at 100° C., to about 66% lysine by weight in water. At 120° C. in water in a sealed container, lysine HCl may be dissolved to about 70% by weight. (See Example 13.)

Component (ii), which is preferably maleic anhydride, is added to the solution in stages, preferably from the melt.

(Maleic anhydride melts at 58° C., and the melt is stable up to 120° C. and higher.) The molar ratio of lysine:maleic (acid or anhydride) may range from 100:1 to 1:1, preferably 80:1 to 5:1, most preferably 50:1 to 10:1. In one embodiment, the molar ratio employed is 30:1 lysine:maleic acid or anhydride. Upon hydrolysis of the anhydride to maleic acid, the pH of the solution typically drops into the preferred range of pH 3 to 4.

Alternatively, the acid or anhydride may be first dissolved in water, followed by addition of lysine. In one embodiment of the process, an aqueous solution of maleic acid is added to dry lysine with stirring to produce a slurry (i.e., a mixture comprising water and dispersed solids). As described in Example 12, it was found that the use of as little water as 40% by weight with respect to dry lysine could be used to form a suitably homogenous mixture for thermal polymerization. The required amount of water can also be reduced by using elevated temperatures, as described in Example 13.

Once prepared, the solution (or slurry) of lysine and maleic acid is then dried to produce a solid, comonomeric composition of lysine and maleic acid/maleate (maleic acid pKa=1.83 and 6.07), preferably as a powder or granular material. This may be done by air drying or heating, e.g. in a forced-air oven or tray drier. Preferable methods include use of a drum drier or most preferably a spray drier.

The resulting dried composition can then be thermally polymerized immediately, or it can be stored indefinitely as dried granular material for later polymerization.

The dried composition is thermally polymerized, preferably at 160° C. to 240° C., for 0.1 to 24 hours. Preferably, the polymerization occurs at 210° C. to 230° C., for 2 to 18 hours, most preferably at 220° C. to 225° C., for 5 to 7 hours. Depending on scale, reactors such as a vented heat-exchange loop, an extruder, or an industrial scale stirred kneading reactor with co-rotating kneaders, such as a List reactor (List AG, Switzerland), may be used singly or in combination. (The use of such industrial scale reactors provides better mixing and heat exchange, such that shorter reaction times can generally be used, as compared to smaller reactors, to obtain high molecular weight polymers.) Reactions may be run under vacuum or, preferably, under mild pressure with an inert gas, preferably nitrogen. The polymerized product, which is typically a melt at 220° C., may be removed continuously as the melt into a cooling device for pelleting or granulation.

Yields of polymer were near theoretical, with no evidence from IR spectra, titration, or ninhydrin assays (for free amine) of any residual lysine or other monomer (e.g. maleic acid) in the products. Accordingly, comonomer residue ratios in the copolymers are believed to closely approximate the reagent comonomer ratios. Residue ratios as stated in this disclosure refer to the reagent comonomer ratios used to prepare the copolymer.

The preferred reaction conditions center about the comonomeric ratio of 30:1 lysine:maleic, which generates a solution at about pH 3.4. In exemplary reactions using this ratio (see e.g. Example 6), drying to form the comonomeric composition, followed by thermal polymerization in the range of 220° C. for 3 to 7 hours, produced water-soluble lysine-maleic copolymers in the range of Mw 70,000. Yields were typically 90% or greater relative to theoretical.

IV. Copolymers of Lysine with Other Amino Acids

Also disclosed herein are high molecular weight, water soluble copolymers of lysine with other amino acids, preferably aspartic acid or a small hydrophobic amino acid such as leucine, isoleucine, valine, alanine, or glycine, with aspartic acid and leucine being more preferred, and aspartic acid most preferred. The ratio of lysine:non-lysine monomer is preferably about 10:1 to about 100:1, and is more preferably about 10:1 to 50:1. In selected embodiments, the ratio is 15:1 to 50:1, or 20:1 to 50:1. As demonstrated below, copolymers of Lys:Asp prepared as described herein, in Lys:Asp molar ratios of 10:1, 15:1, and 20:1, had good coagulant activity.

Thermal copolymerization was carried out using procedures similar to those described above. Samples of, for example, L-lysine hydrate were dissolved in distilled water, and to the resulting solutions were added samples of other amino acids, such as aspartic acid, tyrosine, leucine, alanine, asparagine, and glycine, in various molar ratios as described above. The pH was adjusted into the range of pH 2 to 5, preferably by addition of phosphoric acid. The dishes were then placed in a forced-air oven at 90° C. overnight or until completely dried. Next, they were placed into a vacuum oven under a nitrogen blanket at 170° C. to 230° C., for 1 to 18 hours.

Aspartic acid, by virtue of its trifunctional nature, can theoretically react either as a diacid or as an amino acid, producing either an amine side chain or a carboxyl side chain. Succinimide residues can be formed from two adjacent residues (from reaction of the carboxylic side chain of one aspartic residue and the secondary amine (N—H) of an adjacent residue), but their occurrence is expected to be low due to the low amount of aspartic acid. It is expected that aspartic acid acts primarily as a diacid, producing a primary amine side chain.

Performance of the various products as coagulants is described in Example 8 below. In particular, copolymers of Lys:Asp and copolymers of Lys:Leu, in molar ratios of 10:1, 15:1, and 20:1, were shown to have good coagulant activity.

V. Use of the Lysine-Based Polymers in Water Clarification Processes

As described above, industrial, municipal and agricultural wastewaters often contain substantial amounts of suspended and/or emulsified oils and/or solids. These may include oily droplets, mineral particulates, cellular debris, crop residuals, and other solid and semi-solid matter. Before the water is re-used, recycled to the process, or released to the environment, it is preferably restored to a solids-free, clear condition. Prominent examples include removal of oil and oily solids in water used in oil recovery operations. Similarly, soil components and biological remnants may occur in the water used in recovery and handling of crops and in food processing.

Particularly problematic are waste streams (produced water) from oils sands processing, which produce very large volumes of produced water frequently containing high concentrations of oils, bitumen and mineral particulates. Oils sands processes include SAGD (steam assisted gravity drainage) processes, where water is injected as superheated steam to facilitate liquefaction of oily deposits at depth, followed by movement of the pressurized, oily aqueous stream to the surface. This process involves two horizontal wellbores, one above the other; steam is injected into the upper wellbore, and softened bitumen is recovered from the lower wellbore. Another process is cyclic steam stimulation (CSS), in which steam is injected through a plurality of oil wells to heat the bitumen; once the bitumen is hot, it is recovered using the same wells. The steam used to heat up the bitumen condenses to form water in the reservoir. Most of the condensed water is produced with the oil and is recycled and re-injected as steam.

In one aspect of the invention, the subject lysine-based polymers are used as coagulants in wastewater clarification processes. In one embodiment, the wastewater is produced water from oil sands mining. Processes such as SAGD and CSS mining produce large amounts of produced water at elevated temperatures. The process may also be used for clarification of produced water from surface mining of oil sands.

As described above, in a SAGD (steam assisted gravity drainage) process, removal of the bulk oil after initial phase separation leaves a stable reverse emulsion of residual oil and oily solids in water, termed produced water. The solids content of produced water at this stage is typically 1-2%, and at later stages (e.g. slop streams or tailings ponds) it can range from 1% to 60% solids, often in the range of 30% to 60% solids. Produced waters from surface mining can also have high solids contents, e.g. in the 30% range.

The SAGD produced water, which is at elevated temperatures as a result of the use of superheated steam, is cooled via heat exchangers, typically to a temperature in the range of 85-95° C., prior to addition of the coagulant. The coagulant is added in an amount effective to disrupt the anionic dispersion and promote coalescence of oily droplets and solids into small particles. In accordance with the present invention, the coagulant is a lysine-based polymer, such as a lysine homopolymer prepared as disclosed herein or a lysine copolymer as disclosed herein. Preferably, the coagulant is a lysine copolymer as disclosed herein, and more preferably a lysine:maleic copolymer as disclosed herein.

At the point of addition of the coagulant, the produced water stream is typically moving at high velocity, e.g. around 8 feet/second. It is then directed into large skim tanks, where the stream remains under conditions of low velocity and low turbulence.

In assays or other small scale processes, residence times after addition of coagulant may be 30 seconds to a minute or longer; e.g. 1-5 minutes, prior to addition of flocculant. In large scale SAGD processes, residence times in the skim tanks are longer. For example, with a typical inflow rate of 10,000 gal/min into 500,000-gallon skim tanks, such as those used at SAGD processing sites, the residence time might be, for example, 45-50 minutes. In general, residence times of 30 to 120 minutes or longer may be used, depending on actual rates of inflow and volumes of the receiving tanks. Any oil and oily solids that float at this stage are removed by skimming.

In the next step in the clarification process, flocculant is added to coalesce the coagulated particles into large flocs. Preferred flocculants include those described in co-authored PCT Pubn. Nos. WO 2007/047481 and WO 2010/011867, which comprise blends of anionic or cationic polyacrylamides with a heat-activated or pregelatinized starch having flocculating activity. The heat-activated or pregelatinized starch is typically prepared by aqueous thermal treatment of a native starch, effective to partially water solubilize and partially gel the native starch. An example is Pregel™ 46, an activated starch obtained from Midwest Grain Products, having an approximate Mw of 10-100 million.

Typically, the flocculation step follows transfer of the partially clarified produced water, at an increased rate of flow, into induced flotation devices, where flocculant is added and microbubbles are introduced, preferably simultaneously or near-simultaneously (i.e. within 30 seconds or so) with the flocculant. The microbubbles stick to the oily flocculated particulates and make them float, allowing them to be decanted or skimmed, further clarifying the produced water stream. Further description of such flotation is described in co-authored PCT Pubn. No. WO 2010/011867.

After this process, the stream is typically directed through organic removal filters to remove any residual potential foulants prior to the final steps of silicate removal and ion exchange. The water can then be recycled to steam generators, prior to re-injection into the deep well.

In one aspect of the invention, the subject lysine copolymers are used as coagulants in such a wastewater clarification process. As shown in Examples 2 and 4-7 below, lysine homopolymers and copolymers prepared as described above (i.e. with pH adjustment using phosphoric acid, maleic acid or maleic anhydride, where the latter two also react as comonomers), exhibited good activity as coagulants in small scale tests of SAGD produced water, at levels of 50-100 ppm. In the case of maleic copolymers, molar ratios of lysine:maleic were preferably 10:1 to 100:1, more preferably 15:1 to 50:1, and most preferably around 30:1. Copolymers of lysine and aspartic acid, at molar ratios of lysine:aspartic of 10:1 to 20:1, were also effective as coagulants in this range.

VI. Combination of Lysine-Based Coagulants with Conventional Coagulants

Lysine homopolymers and copolymers as disclosed herein can also be used advantageously in combination with conventional coagulants. Examples of conventional coagulants are homopolymers of diallyl dialkylammonium salts or allyl trialkyl ammonium salts. Poly aluminates may also be used. In one embodiment, the conventional coagulant is selected from polyDADMAC (homopolymer of diallyl dimethyl ammonium chloride), polyEpi/DMA (copolymer of epichlorohydrin/dimethyl amine), or combinations thereof. Preferably, the invention copolymer is a lysine:maleic copolymer, where the mole ratio is 15:1 to 50:1, and most preferably around 30:1.

The invention copolymer and conventional coagulant may be used in various weight ratios, e.g. about 10:1 to about 1:4, preferably about 4:1 to 1:4, more preferably 4:1 to 1:1. As shown in Example 14, a 4:1 by weight blend of lysine:maleic copolymer (30:1 molar) and either polyDADMAC or polyEPI/DMA gave excellent coagulation of SAGD produced water at 50 ppm, when the same level of any of these components alone did not produce coagulation under the same conditions.

Further results using such combinations are shown in Tables 3 and 4 below.

VII. Effectiveness of the Lysine-Based Copolymers in Clarification of SAGD Produced Waters Ideally, purification of wastewaters, such as SAGD produced waters, via coagulation and flocculation results in a clear aqueous phase with very low particulates as well as low levels of oil and grease (O&G). Successful treatment of produced water requires not only removal of oily solids but also reduction of residual hydrocarbon content to an acceptably low level, which is preferably in the range of 10 to 20 ppm, and most preferably to undetectable levels (i.e. zero). Otherwise, equipment in downstream processing steps can become fouled and must be serviced or replaced, at unacceptable expense in terms of down time and direct costs.

Analysis of O&G (oil and grease) and TPH (total petroleum hydrocarbons) is described in Materials and Methods, below. Briefly, hexane is added to a water sample, and phase separation produces an aqueous layer, a hexane layer, and a "rag" layer that separates at the hexane/water interface. Total O&G includes all organic fractions, i.e. the components of the hexane layer and the "rag" layer. Total petroleum hydrocarbons (TPH) include only the nonpolar materials (such as linear alkanes and cyclic/heterocyclic ring structures) that remain after the hexane layer is passed over a column of silica beads to which polar/ionic organics adhere.

Table 1 (comparative data) shows O&G and TPH analysis of SAGD produced water treated with commercial coagulants and flocculants, in accordance with the jar test protocol described in Materials and Methods, below. The anionic flocculant used was a 1:1 mixture of activated starch and an anionic acrylamide copolymer, designated AH 1100, and the cationic flocculant used was a 1:1 mixture of activated starch and a cationic acrylamide copolymer, designated CH 1100 (see Materials and Methods, below).

As shown, total oil and grease levels were reduced from 250 ppm in the untreated water to about 50-60 ppm in the treated water, and petroleum hydrocarbon (TPH) levels were reduced from 61 ppm to essentially zero.

TABLE 1

Oil and Grease Assessment of SAGD Produced Water Before and After Treatment with Prior Art Additives

| Treatment Protocol (Coagulant; Flocculant) | Coagulant, ppm | Flocculant, ppm | Total O&G, ppm | TPH, ppm |
|---|---|---|---|---|
| None (control) | 0 | 0 | 250 | 61 |
| polyEpi/DMA; anionic flocculant AH1100 | 100 | 40 | 51.7 | 0 |
| polyEpi/DMA; cationic flocculant CH1100 | 100 | 40 | 58.6 | 0 |
| polyDADMAC; anionic flocculant AH1100 | 125 | 40 | 54.3 | 0 |
| polyDADMAC; cationic flocculant CH1100 | 125 | 40 | 60.1 | 0 |

Table 2 shows O&G and TPH analysis of SAGD produced water treated with a coagulant of the invention, specifically a lysine:maleic (30:1) copolymer, and a commercial flocculant (SNF 4490 SH, a cationic acrylamide copolymer; see Materials and Methods, below). The SAGD produced water used in these experiments was selected because it was notably difficult to treat, having high levels of solids and hydrocarbons, and requiring relatively high doses of treatment chemicals.

TABLE 2

Oil and Grease Analysis of Highly Contaminated SAGD Produced Water Before and After Treatment with Invention Coagulant and Cationic Flocculant (SNF 4490 SH)

| Coagulant | Coagulant ppm | Flocculant ppm | Total Solids before treatment, ppm | Total Dissolved Solids after treatment, ppm | Total O&G, ppm | TPH, ppm |
|---|---|---|---|---|---|---|
| None (control) | 0 | 0 | 1540 | 1500 | 526.0 | 122 |
| Lys:maleic copolymer 30:1[a] | 225 | 50 | 1540 | 1350 | 42.1 | 0 |
| Lys:maleic copolymer 30:1[b] | 200 | 60 | 1540 | 1350 | 30.0 | 0 |
| Lys:maleic copolymer 30:1: polyDADMAC blend, 4:1 weight basis | 175 | 60 | 1540 | 1350 | 18.3 | 0 |

[a]Polymerized at 220° C. for 5 hours
[b]Polymerized at 220° C. for 7 hours

As shown, total oil and grease levels were reduced from a very high level of 526 ppm in the untreated water to very low levels, i.e. 30-42 ppm, in water that was treated using a lysine:maleic copolymer of the invention for coagulation. The lysine:maleic copolymer prepared using a longer reaction time was more effective, presumably due to higher Mw.

Still lower levels of O&G (18.3 ppm) were achieved using a 4:1 blend of the invention copolymer and polyDADMAC, at a lower total dosing level of coagulant (175 ppm vs. 200-225 ppm) (see Example 14).

In each case, petroleum hydrocarbon (TPH) levels were reduced from 122 ppm to essentially zero.

Table 3 shows further data on coagulation of produced water from an oils sands processing facility (Christina Lake site of Cenovus Energy, previously Encana Corp.) using conventional coagulants, coagulants of the invention, and combinations thereof. As can be seen, blends of the invention compounds with conventional coagulants were significantly more effective, on a weight basis, than either component taken alone.

TABLE 3

Comparison of Coagulation Activity in SAGD Produced Water by Commercial Coagulants and Polylysine and Lysine Copolymers of the Invention

| Coagulant(s) | Minimum dose (ppm actives) for coagulation |
|---|---|
| Poly Epi/DMA | 75 |
| Poly DADMAC (SNF Floquat ™ TS45) | 100 |
| Poly aluminate (Kemira PAX 18) | 125 |
| Polylysine, Mw 4,500 (Sigma) | no coagulation activity up to 500 ppm |
| Polylysine, Mw 84,000 (Sigma) | 75 |
| Polylysine from lysine hydrate, pH 3 (phosphoric), per Example 2 | 75 |
| Lysine-maleic copolymer (Example 6, 220° C., 5 h) | 75 |
| Lysine-maleic copolymer (Example 6, 220° C., 5 h) blended with Poly Epi/DMA; 4:1 weight ratio | 40 |
| Lysine-maleic copolymer (Example 6, 220 C., 5 h) blended with Poly DADMAC; 4:1 weight ratio | 50 |

VIII. Coagulant/Flocculant Dry Blends; Single Treatment Protocol

Useful dry blends of coagulants and flocculants are also provided as an aspect of the invention. The blends can be used as a single additive, as described further below.

As described above, clarification of SAGD produced waters, tailings slurries, and mature fine tailings (see Table 4 below for descriptions and solids content) from surface mining of oil sands can be effectively accomplished by treatment first with a coagulant, followed by at least a brief interval of time under conditions of low shear during which the coagulated particulates may form. After such treatment for at least a few seconds, and preferably 15 to 30 seconds or a few minutes, the fluid containing the coagulated particulates is then treated with a dose of flocculant.

Thus, a typical treatment involves an injection from an aqueous concentrate of coagulant into the process stream, followed by an injection of flocculant downstream of this, generally from an aqueous concentrate of the flocculant, or from an emulsified flocculant stock in oil.

Because of their very high molecular weights, their relatively low ionicity, and their high hydrogen-bonding activity through the acrylamide residues, the flocculants described herein (e.g. SNF 923SH or SNF 4490SH) have relatively low solubility in water, typically less than 1 to 2% by weight. In addition, even such low % aqueous stocks of the flocculants become very viscous, and in practice these materials are made up in water at even lower concentrations, e.g. of 0.1 to 1.0% by weight.

As an alternative, concentrates of the flocculants are often provided in commercial practice as emulsions in light oil (i.e. petroleum distillates, with or without surfactants), at, for example, 30% solids by weight. Such flocculant-in-oil emulsified concentrates are injected into the aqueous process stream to provide an appropriate dose of flocculant in water. However, the flocculant is not immediately solubilized when delivered in this fashion. Rather, it takes a minute or more for the flocculant to dissolve into the aqueous phase, with the dosage continuing to build over time.

Therefore, simultaneous or near-simultaneous addition of a coagulant, fully dissolved in water, along with a flocculant-in-oil stock does allow coagulation to occur for an effective interval of time, e.g. up to several minutes, before flocculation begins. In effect, delivery of aqueous coagulant and oil-based flocculant in this manner allows for the coagulant-followed-by-flocculant mechanism to act and, with proper dosing, does result in clarified water of high quality.

This can be the case even if addition of the flocculant-in-oil stock actually precedes addition of the aqueous coagulant (e.g. by up to a minute or so). Thus, the coagulant-followed-by-flocculant mechanism can be operative, and effective, for clarification of oily produced water streams even when a flocculant-in-oil stock is injected upstream of the coagulant input, since the flocculant frequently has not become solubilized in the water to a significant degree before the coagulant is introduced. Although this sequence of chemical inputs is not preferred, it may be practiced with some benefit and could even occur unintentionally (e.g. an operator might hook up some totes of coagulant and flocculant in the wrong order for a time) without undue harm to the downstream process steps.

However, when a polycationic coagulant and an anionic flocculant are added together or simultaneously from aqueous stocks, where each is essentially fully dissolved upon addition, these treatment chemicals tend to bind to each other instead of the binding sites on the emulsified oily solids. Therefore, neither the coagulant nor the flocculant functions well as a water-clarification agent under these circumstances. Similarly, although to a lesser extent, when a polycationic coagulant and a cationic flocculant are added together or simultaneously from aqueous stocks, they also tend to interfere with each other. This results in significant lessening of the clarification of the water, perhaps due to binding by the cationic flocculant to coagulant binding sites on the emulsified oily solids. This would disrupt both the processes of coagulation and subsequent flocculation.

It was thus interesting to note that it was possible to add coagulant and flocculant together as a dry blend, at appropriate ratios of coagulant to flocculant, and still obtain well-clarified produced waters, tailings slurries, and mature fine tailings. The coagulant essentially dissolves in water immediately, and the coagulation process follows within a few seconds to minutes. The flocculant, on the other hand, being only slowly soluble in water, is not fully solubilized for approximately 20 minutes or more. Hence the effect of the addition of the dry blend of coagulant and flocculant is fundamentally a treatment consisting of immediately solubilizing coagulant followed by the appearance of a slowly solubilizing flocculant in solution, beginning after a few minutes. Thus, the coagulation effect begins almost immediately, with flocculation following after a few minutes and becoming more complete over time. This approach is referred to herein as the "single treatment protocol" (STP), and can be applied to dry blends of any of the coagulants and flocculants described herein. Preferably, the coagulant includes a lysine copolymer or homopolymer prepared as described herein, and the flocculant includes an acrylamide copolymer/activated starch combination.

As an illustration, blends of 4 parts coagulant and 1 part by weight flocculant were prepared, using as coagulants the 30:1 lysine-maleic copolymer of the invention and/or polyDADMAC, i.e. either separately or in combination, as described in Example 14. The flocculants used included the anionic (SNF FL 923 SH) or cationic (SNF FL 4290 SH) acrylamide copolymers described in Materials and Methods, below. The proprietary anionic (AH1100) and cationic (CH1100) flocculants, comprised in part of activated starch, were similarly blended with coagulants.

When used in combination, the coagulants were blended as in Example 14, in ratios of 1:10 through 10:1, weight basis, lysine-maleic copolymer to polyDADMAC. The coagulant or coagulant mixtures were then blended with the flocculants, in ratios of 1:1 through 10:1, weight basis.

Vial tests and jar tests, as described in described in Materials and Methods, below, were run to assess the utility of the dry blends of coagulants and flocculants as water-clarification agents when added as a single treatment (STP). Test samples included SAGD produced water, tailings slurries at 8% solids by weight, and either diluted mature fine tailings at up to 20% solids by weight or undiluted mature fine tailings at up to 40% solids by weight. (Tailings are mixtures of water, clay, sand and residual hydrocarbons, which, in current practice, are typically left to settle in large tailings ponds. Initially, sand separates by sinking, and a top layer of water can be separated and recycled. This leaves a middle layer of dispersed fine clay and/or hydrocarbons and water known as mature fine tailings (MFT). This material is high solids, i.e. 30% to 40% or more, and highly resistant to further settling.)

Ratio of coagulant-to-flocculant and dosing for the tests was selected by first assessing the amounts of coagulant and flocculant required to clarify a sample via the coagulant-followed-by-flocculant protocol. For example, excellent clarification of SAGD produced water is often achieved via a coagulant dose of 75 ppm followed by a flocculant dose of 10 to 20 ppm. Hence a formulation of 4 parts coagulant blended with 1 part flocculant was selected as a potentially effective formula. Accordingly, to treat 1 kg of the sample of the SAGD produced water, 75 mg of coagulant was indicated, and therefore a total amount of 90 to 100 mg of the blend was projected as a likely effective dose via the single treatment protocol.

The results of the tests tracked this reasoning well for the SAGD produced water, the 8% solids tailings slurry, and the diluted mature fine tailings (~20% solids). The STP approach worked well when there was enough water in the sample to promote good stirring and dissolution of the treatment chemicals. However, treatment of undiluted mature fine tailings (up to 40% solids by weight) was less effective via the single treatment protocol. If the amount of solids was greater than 20%, the effectiveness of the treatment was diminished to the point of appearing ineffective at 30 to 40% solids. By "ineffective" is meant that there was little or no separation of an upper, clarified water layer and a lower layer of agglomerated solids.

If the dosing of the blend was increased under these high solids conditions, the results were improved somewhat. While the overall clarity of the water was poor and there was little or no separation into layers, there was an overall effect of agglomeration of the solids, which held together well when the mixture was filtered.

Representative results are shown in Table 4. As noted above, the coagulants included the lysine-maleic copolymer of Example 14, polyDADMAC, and the two in combination, also in a 4:1 weight ratio. The flocculants that were evaluated included the anionic and cationic acrylamide copolymers Flopam™ AN 923 SH and FO 4490 SH, and the proprietary anionic and cationic flocculants AH110 and CH1100, described below in Materials and Methods.

The blends that were effective, shown in the Table below, were comprised of 4 parts coagulant and 1 part flocculant by weight.

The lysine-maleic copolymer coagulant performed best with cationic acrylamide copolymers; it lost some activity as a coagulant when combined with anionic flocculants (data not shown).

TABLE 4

Clarification of Produced Water Samples Treated with a Dry Blend of Coagulant and Flocculant (4:1 weight ratio) added as a Single Treatment (STP)

| Sample: appearance | Treatment | Result |
| --- | --- | --- |
| SAGD produced water: amber colored, stable microemulsion with oily solids at ~0.3% by weight | 100 mg 4:1 blend per kg sample | Good water clarification, clear fluid with oily solids interspersed top to bottom |
| Tailings slurry: murky, stable with emulsified particulates of clay, sand, and oily residuals with 8% solids by weight | 300 mg 4:1 blend per kg sample | Good water clarification, good separation of clear fluid (top) and solids enriched in clay and sandy microparticulates (bottom) |
| Mature fine tailings, diluted 1:1 with tapwater: similar to above with 15% or 20% solids by weight, depending on source | 500 mg 4:1 blend per kg sample | Good water clarification, good separation of clear fluid (top) and solids enriched in clay and sandy microparticulates (bottom) |
| Mature fine tailings, undiluted: murky to muddy, stable as above with 30% or 40% solids by weight, depending on source | 500 to 2,000 mg 4:1 blend per kg sample | Agglomeration of solids; poor water clarification, poor separation of fluid (top) and solids (bottom) layers |

IX. Flotation and Separation Methods

As described in co-owned PCT Pubn. No. WO 2010/011867, flocculated oils and/or solids formed by addition of a polycationic coagulant and flocculant, as described above, can be rendered buoyant by inclusion of a gaseous phase of microbubbles of a gas together with the flocculant. The gas may be air, nitrogen, methane, another hydrocarbon, e.g. propane, an inert gas, such as neon or argon, or another such gas. For reasons of convenience and economy, air is typically used, although a hydrocarbon may be preferred if it is seen to provide greater adhesion to oily contaminants.

In a preferred flotation procedure, gaseous microbubbles are introduced simultaneously or near-simultaneously (i.e. within 30 seconds or so) with flocculant. Thus, the microbubbles are present in the process stream when the flocculant begins to act on the coagulated particles. As the flocs form, the microbubbles are stably encapsulated within agglomerates of oily solids or semisolids, causing the flocs to float quickly to the surface when the turbulent stream reaches the quieter volumes of the skim tank or other large-volume vessel or device in the process stream.

Accordingly, in one preferred process, a coagulant is first added to the process water, and the gas microbubble phase, such as air, is then incorporated, along with the simultaneous input of flocculant. A short incubation time may precede addition of the gas bubble phase and flocculant. Alternatively, as described herein, coagulant and flocculant may be added together as a dry blend, or aqueous coagulant may be added together with, or even somewhat after, an oil emulsion of flocculant. Again, the microbubbles are preferably introduced simultaneously or near-simultaneously (i.e. within 30 seconds or so) with the flocculant. Preferably, turbulence is minimized so that coagulation is not disrupted.

As the flocculant becomes distributed, beginning immediately and proceeding typically over a few to several minutes, flocculated and agglomerated oily solids form in the presence of the microbubbles, which become incorporated into the oily solid materials. This process thus efficiently separates buoyant phase of solid or semisolid flocculated materials from a clarified aqueous phase.

The coagulation and flocculation processes described herein thus efficiently separate a wastewater process stream into separate phases, including a clarified aqueous phase and a buoyant flocculated solid or semisolid phase. The phases may be separated in various ways; for example, the buoyant flocs, containing entrained microbubbles, may be skimmed, screened or decanted readily, leaving behind the clarified aqueous layer. The water layer may also be decanted or drained from a lower level of the vessel.

The clarified produced water stream may be separated from the flocculated solids by high-volume, continuous-throughput screening. The screening device preferably incorporates an inclined screen of stainless-steel mesh of wedge wire having appropriate pore size, typically in the range of 200 microns. Another separation strategy employs a decanter centrifuge, which works continuously in a flow-though mode to spin an upper clarified aqueous phase out the top and push flocculated and agglomerated solids phase out the bottom of the stream as it moves though the decanter. Other separation strategies and devices that may be used include hydroclones, filter presses, vacuum-assisted filters, and combinations of these.

EXPERIMENTAL

I. Materials and Methods

A. Reagents. Lysine in its several forms, other amino acids, poly-L-lysine of various molecular weights, maleic anhydride, and the other reagents used in the experiments were obtained from Sigma-Aldrich unless otherwise noted, as were poly-L-lysine monohydrobromides of various molecular weights. These were used as control molecules in coagulation experiments and as Mw standards in gel electrophoresis profiles. Feed grade L-lysine monohydrochloride (98.5%) was obtained from Archer Daniels Midland Company (ADM) and CJ Corporation (99%) for use in larger scale synthetic reactions. Aqueous solutions of this material were also obtained from ADM at approximately 50% lysine by weight. Lysine sulfate (50.4%) from Evonik Degussa was also evaluated as a possible feedstock.

B. Additives (Coagulants and Flocculants)

Flopam™ AN 923 SH (SNF Inc.), a commercial flocculant, is a 20:80 acrylate:acrylamide (anionic PAM) of approximately 12 million Mw. (Molecular weight assignments are based on viscosity measurements.)

Flopam™ FO 4490 SH (SNF Inc.), a commercial flocculant, is a 40:60 ATAC (alkyltrialkyl ammonium chloride): acrylamide (cationic PAM) of approximately 6 million Mw.

Floquat™ FL 2749 (SNF Inc.), a commercial coagulant, is a PolyEpi/DMA of approximately 120,000 Mw.

AH1100 is a starch/copolymer composition containing a 1:1 weight ratio of Pregel™ 46, an activated starch obtained from Midwest Grain Products, approximate Mw 10-100 million, and Flopam™ AN 923 SH (above).

CH1100 is a starch/copolymer composition containing a 1:1 weight ratio of Pregel™ 46 (above) and Flopam™ FO 4490 SH (above).

Each of the three starch/copolymer compositions contains 15 ppm isothiazolinone (Kathon™, Rohm & Haas) as a preservative.

C. Characterization of Polymers

Molecular weight assessment via gel electrophoresis. The molecular weight of the polycationic materials was determined via movement through a polyacrylamide gel of increasing crosslink density under the influence of an electric field. In this method, the porosity of the gel decreases in proportion to the long dimension of the gel, such that the smaller molecules move farther than larger molecules. Polyacrylamide mini gels (8.5×10 cm, Pierce Biotechnology Inc.) of 4 to 20% crosslink density were used, and polylysine HBr standards (Sigma) having Mw's ranging from 4,200 to 166,000 based on multi-angle laser light-scattering assignments were used for calibration. Gels were run and fixed using standard procedures and stained with Coomassie stain (anionic blue dye, Gel Code Blue, Thermo Scientific) for assessing the distances of migration of standards and analytes. Crystal violet (Fisher Scientific, Mw=408.9) is a small, cationic chromophore that migrated quickly through the gel with a movement that could be followed visually. The gel runs were terminated when this cationic marker was seen to approach the end of the gel. Typical parameters for the electrophoresis were 150 volts, 250 milliamps, with a run time of approximately 45 minutes. Gel loadings were usually 50 μg of the polylysines and the copolymers from stock solutions of 5 mg/ml. Crystal violet was loaded at 5 μg from a stock of 0.5 mg/ml. A minigel electrophoresis apparatus (Fisher Scientific, FB300) was used. The running buffer was 0.1 M Tris (Aldrich), pH 8.0.

Figure 6:
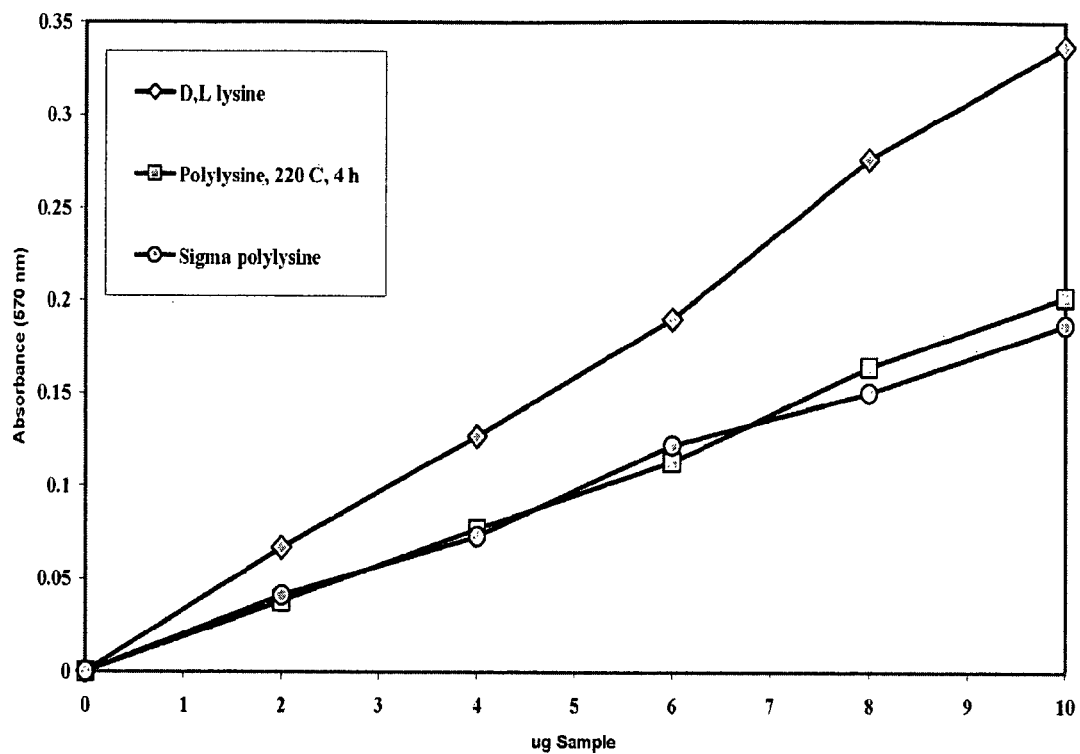
FIG. 6 is a graph showing absorbance at 570 nm vs. amount of sample, as generated by ninhydrin detection of primary amines in a sample of monomeric lysine, a polylysine standard (Sigma), and a lysine polymer of the present invention, prepared via thermal polymerization of lysine hydrate. The lysine hydrate was dissolved in water, adjusted to pH 3 with phosphoric acid, dried, then polymerized at 220° C. for 4 hours. The phosphoric acid was removed from the product by dialysis prior to preparation of the stock solution for ninhydrin treatment.
Figure 7:
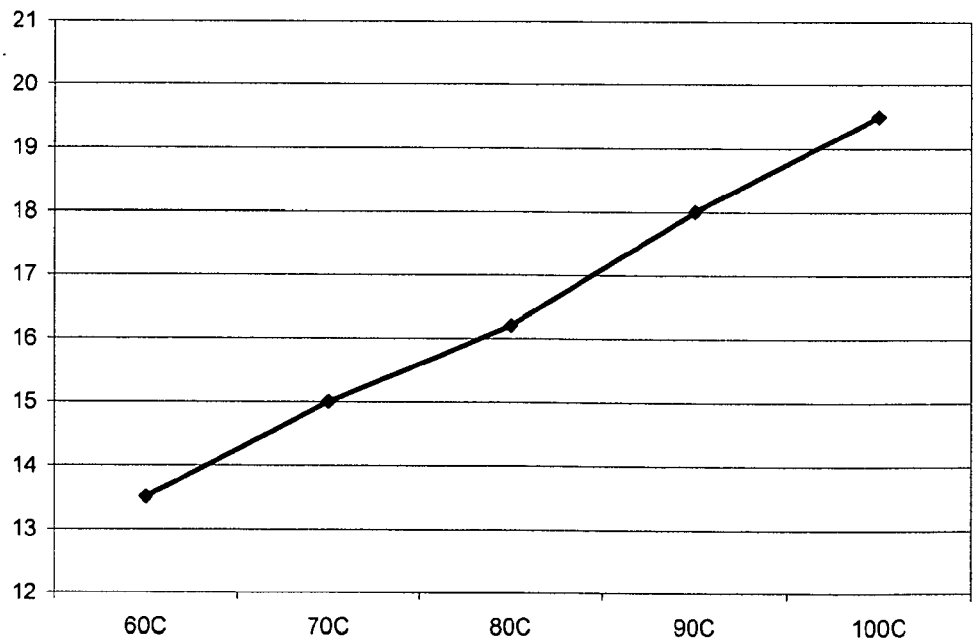
FIG. 7 is a graph showing the aqueous solubility (g/10 ml water) of lysine HCl with increasing temperature.

Ninhydrin assay for free amines. The presence of primary amines, two per molecule of lysine and 1 per residue of polylysine, can be detected by reaction with ninhydrin, which yields a blue product. Standard curves of absorbance (570 nm) versus concentration were generated for L-lysine HCl, for other forms of lysine, and for polylysine standards (Sigma). Lysine polymers would be expected to contain roughly 50% of the absorbance signal per unit weight as compared to lysine monomer, assuming that the primary amines of the R-groups of lysine residues in the polymers were not degraded during thermal polycondensation and that the ninhydrin reactivity of each polymeric primary amine remained roughly the same as that of their counterparts in lysine monomer. As shown in FIG. 6, the primary amine content of polylysine prepared in accordance with the disclosure was essentially the same as that of commercial polylysine.

D. Coagulation Activity Assays

Produced water was obtained from several SAGD sites in Alberta, Canada. For vial tests and jar tests, described below, 10 g or 300 g samples of produced water were weighed into 20 ml glass vials or 400 ml glass jars, respectively. These were tightly capped and heated to 90° C. in a forced-air oven prior to use.

Stock solutions of coagulants were prepared at 5 to 50 mg actives per ml. Stock solutions of flocculants were prepared at 1 to 14 mg actives per ml. Stock solutions of the biodegradable flocculants (AH1100 and CH1100) were preserved with 15 ppm of isothiazolinone (Kathon™, Rohm and Haas or Acticide® CT, Thor Specialties).

The flocculants, which are of very high molecular weights, are known to decrease in molecular size and therefore in activity in aqueous solution with time. Therefore, the flocculant stocks were typically prepared the day before they were used. In comparison, coagulants, including the lysine-based coagulants, perform well at much lower molecular sizes. Stock solutions of the lysine-based materials included 15 ppm of the isothiazolinone preservative.

Figure 5A:
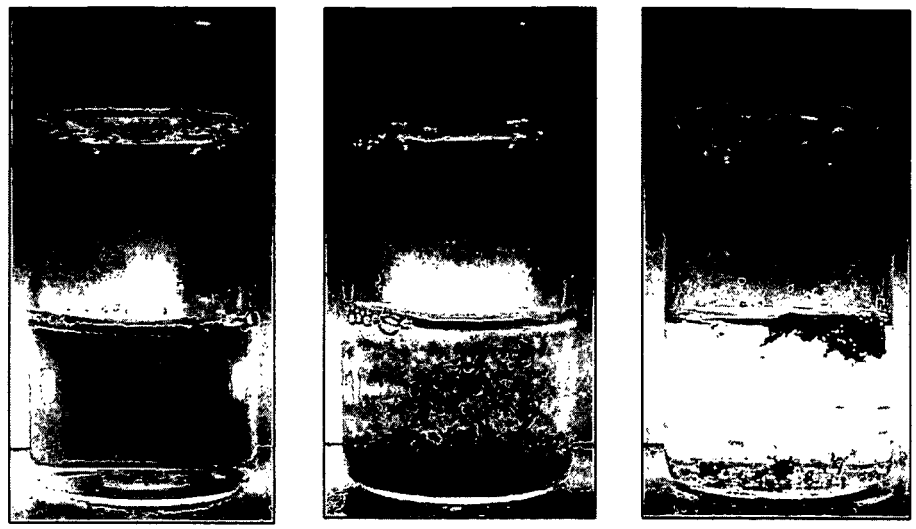
FIGS. 5A-5B are a photographic image and a schematic drawing, respectively, of 20-ml vials containing produced water from a SAGD oil recovery operation, untreated and treated with a lysine-maleic copolymer coagulant of Example 6. Shown in sequence are: untreated water, water treated with the coagulant; and water treated with the coagulant followed by a flocculant.
Figure 5B:

Vial tests. Initial assessments of coagulation, i.e. formation of an oily-solids phase separate from an aqueous phase (see e.g. FIG. 5), were made on a small scale in 20 ml glass vials.

SAGD produced water was obtained from several sites in the oil-sands region of Alberta, Canada. Samples of 10 g of the oily water were pipetted into each of a set of vials, capped tightly, and preheated in a forced-air oven at 90° C. The samples remained as stable, reverse emulsions of oil and oily solids in water for months under these conditions, although usually they were used in experiments within a few days.

In a typical experiment, a coagulant stock solution (e.g. 50 mg/ml) was pipetted into the vial to provide a dose usually in the range of 25 to 100 ug/g (ppm) of active agents. After a period ranging from about 30 seconds to 1 minute or less, if the dosing was well matched to the sample, visible microparticles of coagulated oily solids could be seen in the vial. If the coagulant dose was too low or too high, the dispersed particulates did not coagulate. Rather, the emulsion would remain anionically dispersed at the too low dose or would become cationically dispersed at the too high dose, and in either case would fail to begin the process of separation.

The next step involved the addition of a flocculant, typically at a dose of 5 to 60 mg per kilogram, depending on the characteristics of the produced water. For example, a flocculant stock solution of an acrylamide/acrylate copolymer (anionic PAM, e.g. AN 923 SH from SNF Inc.) or of an acrylamide/allyl triethyl ammonium chloride (ATAC) copolymer (cationic PAM, e.g. FO 4490 SH from SNF Inc.) at 2 mg/ml of active agents was prepared from the dry powders at 100% actives. To provide a dose of 10 ppm of flocculant in the vials, for example, 50 microliters of the stock solution were pipetted into the 10 g of produced water. The vial was then swirled by hand for a few seconds and the flocs were allowed to form over the next minute or so, beginning almost right away but with floc size increasing and agglomeration of flocs occurring over the next few minutes.

Jar tests. The vial tests are useful in initial assessments of treatment chemicals and protocols, particularly when experimental treatment chemicals first become available and are in limited supply. Similarly, the vial tests may be appropriate when the supply of available produced water is limited, for example when received at an external site or lab that is remote from the production site. However, because the vials have relatively high surface areas and a limited volume of water to be clarified, the effective amounts of the treatment chemicals and the oily particulates, or both, may become skewed via interactions with the inner surfaces of the vial. In addition, once a prospective treatment strategy is identified, it is necessary to generate a sufficient volume of treated water for subsequent analytical measurements of residuals of oily particulates, suspended solids, total solids, and the like. For these reasons among others, jar tests are commonly run, for example as follows.

First, 300 g of produced water are weighed into a 400 ml glass jar. To this is added a polycationic coagulant as above, typically in the range of 25 to 100 ppm, although higher doses are encountered in practice from time to time. The jar is swirled manually then placed on the bench top for about 1 minute to allow the oily phases to coagulate into micron-sized particulates. Next, the flocculant is added, typically in the range of 5 to 60 ppm, and the jar is again swirled vigorously by hand for 10 to 30 seconds, and set on the bench for continued flocculation and agglomeration of solids. After a period of another minute or few minutes, large agglomerations of oily solids, typically up to the millimeter range in size, and higher in some cases, are formed. Depending on the composition and characteristics of the produced water, these solids typically are mildly positively buoyant, neutrally buoyant, mildly negatively buoyant, or a combination of these.

The oily solids can be removed by filtration, screening, centrifugation or such methods. The clarified water then is ready for analytical assessments of residual oily chemicals and other components.

E. O&G measurements. Both the ASTM (American Society for Testing and Materials) and the US EPA (Environmental Protection Agency) have issued standards for measuring O&G, which are periodically updated. See, e.g., ASTM method D 7066-04 and EPA methods 1664, 9071A.

The ASTM methods and EPA methods are fundamentally similar. The most basic approach is gravimetric. The oily components are separated from the produced water by solvent extraction, and the solvent is removed by mild heating and evaporation. The residual hydrocarbons per unit volume of produced water are determined by weighing the residue. When appropriate precautions are taken, this approach avoids loss of volatile organic compounds, if such components have not already been vented in a prior heated process step. The gravimetric approach in its various forms is the standard to which other, indirect, analytical methods are compared. These indirect methods, particularly an infrared method, are in common practice because they generally are faster and easier to implement than the gravimetric approach, while still viewed as generating reliable results.

These methods produce two categories of results: total O&G and total residual hydrocarbons. Total O&G includes all of the residual oily materials after removal of the water and water-soluble solutes. Total residual hydrocarbons include only the nonpolar materials (such as linear alkanes and cyclic/heterocyclic ring structures) that remain after a treatment with silica gel particles that is designed to remove polar and charged organic components. In the studies reported herein, the direct, gravimetric ASTM/EPA methods, along with an indirect spectroscopic (FTIR) method, were used.

II. Examples

Example 1

A. Thermal polymerization of D,L-lysine (free base); no pH adjustment.

D,L-lysine (Mw 146.2, free base, zwitterionic, no counterion) and lysine hydrate (Mw 164.2, zwitterionic free base having one water of crystallization per lysine) were obtained from Sigma-Aldrich, Inc. A sample of 1 mmol (146 mg) was weighed into each of a set of 175-ml Pyrex™ dishes. Five ml of distilled water were pipetted into each dish to dissolve the lysine. The dishes were then placed in a forced-air oven at 90° C. overnight or until completely dried.

The dried samples were placed into a convection oven under a nitrogen (or $CO_2$) blanket at 170 to 230° C. for periods up to 18 hours. When the reaction was complete, each dish was removed and the contents were weighed and transferred into 20-ml glass vials.

The free base form of lysine is crystallized at its isoelectric point (pH~9.7) and thus when redissolved, as in this example, forms an alkaline aqueous solution around this value. Polymerization of lysine, like other amino acids, is not favored under alkaline conditions, even dry, owing to loss of the primary amine groups upon heating. Consequently, formation of polylysine products was mainly limited to the lower temperatures, e.g. 180° C. Yields were reduced (~80%), due not only to the relatively insufficient temperature of condensation but also to some sublimation.

If a stream or air rather than nitrogen or carbon dioxide was provided during the thermal treatment, all of the samples darkened badly, even after 0.5 hours. With no gaseous stream provided, the water of condensation inhibits the reaction. If the reaction was run under a vacuum, approximately 60% of the monomer was lost to sublimation.

Lysine hydrate in the dry, crystalline form was unreactive when subjected to conditions of thermal polymerization. It did not polymerize, nor did it lose weight, indicative of loss of the water of condensation. It began to discolor at temperatures>180° C.

B. Use of the Product of (A) as a Coagulant in Jar Tests for Clarification of SAGD Produced Water.

The polylysine products from (A) were made into aqueous solutions of 25 mg/ml and tested for performance as coagulants on SAGD produced water, using protocols described above. The most effective product as a coagulant in this series was that prepared under conditions of 180° C. for 1.5 hours. It exhibited good performance as a coagulant at a dose of 100 μg/ml (mg/l, ppm). Samples heated longer than 2 hours had darkened badly and did not perform well.

Example 2

A. Thermal Polymerization of D, L-Lysine and Lysine Hydrate, with pH Adjustment Using Phosphoric Acid.

In the same manner as described in Example 1, 1 mmol of D, L-lysine or lysine hydrate was dissolved in 5 ml of distilled water in a Pyrex™ dish. Concentrated phosphoric acid (14.8M) was added to adjust the pH to 2-5. The dishes were then placed in a forced-air oven at 70° C. overnight or until completely dried. Next, they were placed into a convection oven under a nitrogen blanket at 170 to 230° C. for periods up to 18 hours.

The products were produced in better yield (≥90%) at pH 3 to 4. The temperature of condensation could be increased to 220° C. without burning the products for periods up to 3 hours.

Adjustment of the solutions to pH 5 provided no benefit. Use of sulfuric acid or nitric acid rather than phosphoric acid led to burned products, even at the preferred pH range of 3-4.

Once dissolved in water and redried, lysine free base and lysine hydrate behaved essentially the same chemically. Their polymer products prepared under similar reaction conditions were essentially the same in yield and performance, correcting for the water of crystallization of the lysine hydrate.

B. Use of the Product of (A) as a Coagulant in Jar Tests for Clarification of SAGD Produced Water The products were made into solutions of 25 mg/ml and tested for performance as coagulants on SAGD produced water. The samples that were prepared at conditions of pH 3-4 and 2 hours at 210° C. exhibited the best performance as a coagulant of SAGD produced water in this series of products, working well at 75 ppm.

Example 3

Thermal Treatment of Lysine Chlorides; No pH Adjustment

L-lysine monohydrochloride (Mw 182.6) was obtained from Archer-Daniels-Midland Co. and Chiel Jedang. Lysine dihydrochloride (Mw 219.1) was obtained from Sigma. Samples of 1 mmole of the lysine chlorides were dissolved in 5 ml of distilled water in each of several 175 ml Pyrex™ dishes. The dishes were then placed in a forced air oven at 90° C. overnight or until completely dried. Next, they were placed into a convection oven under a nitrogen blanket at 170 to 230° C. for periods of 1 to 18 hours. At the desired interval, each dish was removed and the contents were weighed.

Lysine HCl and lysine 2HCl were thermally stable up to 220° C. but were unreactive. Polymer products were not formed. There was no loss in weight after thermal treatment, as would occur with release of 1 molecule of water of condensation per amide bond.

Example 4

A. Thermal Polymerization of Lysine Chlorides, with pH Adjustment Using Phosphoric Acid.

In the same manner as described in Example 3, 1 mmole samples of lysine monohydrochloride and dichloride were dissolved in 5 ml of distilled water in Pyrex™ dishes. Concentrated phosphoric acid (14.8M) was added to each dish to obtain a pH from 2 to 5. The dishes were then placed in a forced-air oven at 90° C. overnight or until completely dried. Next, they were placed into a convection oven under a nitrogen blanket at 170 to 230° C. for lengths of 1 to 23 hours. At selected intervals, each dish was removed and the contents weighed and collected into 20-ml glass vials.

The product of the reaction conditions of pH 3, 220° C., 4 hours was obtained in 92% yield (determined by loss of water weight) and had a Mw of ~12,000.

If the polymerization time was extended to 23 hours, the coagulant activity of the products remained good but did not improve. The color of the products darkened with time, particularly with increased temperature.

B. Use of the Products of (A) as Coagulants in Jar Tests for Clarification of SAGD Produced Water.

The products were made into solutions of 25 mg/ml and tested for performance as coagulants on SAGD produced water. The samples that were prepared at conditions of pH 3-4 and 4 to 7 hours at 190 to 230° C. each resulted in products that functioned well as coagulants at 75 to 100 ppm.

Example 5

A. Thermal Polymerization of L-Lysine Hydrate, with pH Adjustment Using Phosphoric Acid.

Samples of 164 mg (1 mmol) of L-lysine hydrate were dissolved in 5 ml of distilled water in Pyrex™ dishes. Concentrated phosphoric acid (14.8M) was added to adjust the solutions to pH to 2 to 5. The dishes were then placed in a forced-air oven at 90° C. overnight or until completely dried. Next, they were placed into a convection oven under a nitrogen blanket at 170 to 230° C. for lengths of 1 to 23 hours. When the reaction was complete, each dish was removed and the contents were weighed and collected into 20-ml glass vials.

The products were water soluble and were obtained in yields of about 90% of theoretical.

If the pH was adjusted with $H_2SO_4$ rather than phosphoric acid, the products blackened. Some of these, however (pH 3, 190 to 210° C., 1 to 2 hours), remained mostly soluble and did exhibit good activity as coagulants of SAGD produced water at 100 ppm (below). Yields ranged from 80 to 86% of theoretical.

B. Use of the Products of (A) as Coagulants in Jar Tests for Clarification of SAGD Produced Water.

The products were made into solutions of 25 mg/ml and tested for performance as coagulants on SAGD produced water. Each of the products that were dissolved at pH 3-4 and polymerized at 180 to 230° C. for various intervals exhibited good activity as coagulants. For example, the phosphoric-catalyzed reaction at 190° C. for 1 hour, 2 hours, 3 hours, 5 hours, and 7 hours yielded products showing good activity at 125 ppm, 100 ppm, 100 ppm, 75 ppm, and 50 ppm, respectively. Extending this reaction to 23 hours led to a darker product, but the coagulation activity remained good at 50 ppm.

Example 6

A. Thermal Copolymerization of L-Lysine Monohydrochloride and Maleic Acid or Anhydride; Various Ratios; No Other Added Acid.

A sample of 1 mmole lysine HCl (182.6 mg) was dissolved in 5 ml of distilled water in each of several 175 ml Pyrex™ dishes. Maleic anhydride (Sigma-Aldrich) was melted at 90° C. in the forced air over prior to addition to the lysine solution. The melt was pipetted into the solutions, either pre-warmed or left at room temperature, and the contents stirred until the pH stabilized. The maleic anhydride was converted to maleic acid upon hydrolysis in the aqueous solution, with a concomitant lowering of pH. Alternatively, maleic acid itself (Sigma-Aldrich) was used to confirm the utility of maleic anhydride as a reactant. The results described below were the same in either case.

Maleic acid or anhydride was introduced in molar ratios of 8.5:1 to 100:1, lysine:maleic. The dishes were then placed in a forced-air oven at 90° C. overnight or until completely dried. Next, they were placed into the convection oven under a nitrogen blanket at 170 to 230° C. for lengths of 1 to 18 hours. At the selected interval, each dish was removed and the contents were weighed and collected into 20-ml glass vials.

At comonomer ratios approaching 100:1, the pH of the solutions began to range near and slightly above pH 4. At comonomer ratios of 10:1 and lower, the pH of the solutions approached pH 3. Although these ratios led to reasonably effective polymer products, reactions carried out at pH>4 (lower amounts of maleic) did not polymerize to high yield, and the polymer products tended to be lower Mw. Reactions carried out at pH<3 (higher amounts of maleic) tended toward more insoluble (presumably due to crosslinking) products.

The preferred reaction conditions centered about the comonomeric ratio of 30:1 lysine:maleic, which generated a solution at pH 3.42. Upon drying to form the comonomeric composition, followed by thermal polymerization in the range of 220° C. for 3 to 7 hours, water-soluble, lysine-maleic copolymers in the range of Mw 70,000 were produced in high yield, typically 90% of theoretical. These products occurred as melts at temperature and upon cooling formed into amber-colored glasses. They tended to adhere strongly to the dishes and consequently some product was lost or not collected during the scraping and transfer from the dishes to the vials, accounting for some lowering of the yield estimates.

An exemplary reaction sequence is as follows. A sample of 18.3 g (0.1 mole) of lysine HCl was dissolved in 100 g of water in a 600 ml beaker with stirring at 60° C. on a heated magnetic stirplate. To this solution was added 0.327 g (0.224 ml) of maleic anhydride (3.33 mmol), previously melted in the forced-air oven at 90° C. The pH of the resulting solution was 3.42. The solution was poured into a Pyrex™ dish (5.5"×7.5"×1.5"), placed into the forced-air oven at 80° C., and dried overnight. The dish was next placed in a convection oven, having a viewing glass on the door, preheated at 220° C. and purged with a stream of nitrogen from a high pressure cylinder set to minimal flow. The nitrogen flow was visualized via a steady stream of bubbles through a water trap on the outflow. The polymerization was allowed to proceed for 5 hours. Between 2 and 3 hours, the polymerizing mass was seen to undergo a melt and remained in the melt until termination of the reaction at 5 hours.

On cooling, the melt became a solid, glassy mass. This product was scraped from the Pyrex™ dish and weighed. The yield was 14.8 g of an amber product, or ~90% of theoretical. The material exhibited good performance as a coagulant. Its Mw was estimated via gel electrophoresis at ~70,000.

B. Use of the Products of (A) as Coagulants in Jar Tests for Clarification of SAGD Produced Water.

The products from (A) were made into solutions of 25 mg/ml and tested for performance as coagulants on SAGD produced water.

All of the polymer products that fell within the reaction conditions of 15:1 to 50:1 comonomer ratio (lysine:maleic), pH 3 to 4, and sufficient temperature and time of polymerization exhibited good performance as coagulants in SAGD produced water. For example, the products typically led to coagulated produced water at doses of 75 to 125 ppm.

Example 7

Thermal Polymerization of L-Lysine Monohydrochloride and Maleic Acid, with pH Adjustment Using $H_3PO_4$; Use as Coagulants in Jar Tests for Clarification of SAGD Produced Water In the same manner as described in Example 6, 1 mmol samples of lysine HCL were dissolved in 5 ml distilled water and mixed with maleic acid in Pyrex™ dishes. In this set of experiments, the pH was adjusted to pH 2 to 3 with concentrated phosphoric acid (14.8M). The samples in the dishes were then placed in a forced-air oven at 90° C. overnight or until completely dried. Next, they were placed into a vacuum oven under a nitrogen blanket at 170 to 230° C. for lengths of 1 to 7 hours. At the desired interval, a dish was removed and the contents were weighed and collected into 20-ml glass vials. These products were made into solutions of 25 mg/ml and tested for performance as coagulants on SAGD produced water.

The results of these experiments were essentially the same as those of Example 6. This showed that the benefit of pH adjustment with maleic was sufficient without additional phosphoric acid. It also showed that the possible contribution of phosphoric as a dehydration agent during the polymerization was not necessary for production of good coagulant products.

Example 8

Thermal Polymerization of L-Lysine Hydrate and Other Amino Acids, with pH Adjustment Using Phosphoric Acid; Use as a Coagulant in Jar Tests for Clarification of SAGD Produced Water Samples of 146 mg (1 mmol) of L-lysine hydrate were dissolved in 5 ml of distilled water in Pyrex™ dishes. To these were added samples of other amino acids, including aspartic acid, tyrosine, leucine, alanine, asparagine, and glycine, in various molar ratios.

The pH was adjusted into the range of pH 2 to 5 by addition of phosphoric acid (14.8M). The dishes were then placed in a forced-air oven at 90° C. overnight or until completely dried. Next, they were placed into a vacuum oven under a nitrogen blanket at 170 to 230° C. for 1 to 18 hours. At the selected interval, each dish was removed and the contents were weighed and collected into 20-ml glass vials. The products were made into solutions of 25 mg/ml and tested for performance as coagulants on SAGD produced water.

A. Lysine: Aspartic Acid in Molar Ratios of 10:1, 15:1, 20:1.

Aspartic acid was employed as a dicarboxylic acid comonomer that is commercially available in quantity and that could function as a chain-extender and possible cross-linker. The comonomeric compositions were prepared in solution at pH>5 (aspartic acid is relatively insoluble at lower values of pH) prior to lowering of the pH with phosphoric acid.

Water-soluble polymers with good coagulant activity were produced in high yield from solutions adjusted to pH 3 and polymerized at 190 to 210° C. for up to 5 hours. For example, the copolymer produced with conditions of lys:asp 15:1, pH 3, 200° C., 5 hours exhibited good coagulation activity at 75 ppm in SAGD produced water. Similarly, a copolymer made with conditions of lys:asp 15:1, pH 2.5, 200° C., 4 hours also coagulated the produced water at a dose of 75 ppm. Products prepared with higher aspartic content, with longer polymerization times, and/or at temperatures≥190° C. had reduced water solubility.

B. Lysine:Leucine in Molar Ratios of 1:1, 5:1, 10:1, 15:1, 20:1.

Copolymers of lysine and leucine were synthesized and evaluated as coagulants, in order to determine whether a degree of hydrophobicity would improve affinity for oily components and thereby enhance coagulation activity.

Molar ratios of lys:leu with higher leucine content were evaluated when it was noticed that solubility remained good with relatively high levels of leucine.

Thermal polymerizations were run using comonomeric compositions prepared from solutions at pH 3 to 4, 190 to 210° C. for 1 to 5 hours. The comonomer molar ratios of 1:1 and 5:1 led to insoluble and partially soluble products. Coagulants with good water solubility and coagulation activity were produced at the other molar ratios under these conditions. However, there was no particular improvement in the coagulation activity of these copolymer products relative to the lysine:aspartic copolymers.

C. Lysine:Leucine:Aspartic Acid 15:1:1, 20:1:1, 30:1:1.

For comparative purposes, terpolymers of lysine, leucine, and aspartic acid were prepared from comonomer compositions that were dried from solutions at pH 3 via phosphoric addition. Thermal treatment was 210° C. for up to 4 hours. These materials did not exhibit good water solubility and did not perform well as coagulants.

D. Lysine and Other Amino Acids as Comonomers.

Similarly, comonomer compositions of lysine and other amino acids such as glycine, alanine, and tyrosine were prepared from solutions with and without pH adjustment. Thermal polymerizations as described above were run under a variety of reaction conditions, typically 10:1, 190° C., 1 to 7 hours. In general, the water solubility of the products was not good. However, some of the products did exhibit reasonable activity as coagulants if prepared from aqueous solutions having the pH adjusted to pH 3.

Example 9

Preparation of 30:1 Molar Comonomer Mixture of L-Lysine Monohydrochloride and Maleic Acid Dried from Aqueous Solution Dry comonomer compositions of lysine and maleic acid were prepared in various amounts ranging from a few grams to 20 kilograms. For example, 1 kilogram of lysine monohydrochloride (5.5 moles) was dissolved in 2 liters of water at 60° C. A melt of maleic anhydride was prepared by heating briquettes (Aldrich) at 90° C. Then, 0.18 mole was pipetted into the lysine solution and allowed to stir until pH stabilized around 3.2. The solution was poured into large Teflon®-coated pans and dried overnight at 120° C. The dried comonomer compositions could be easily removed from the pans on cooling. They were then ground with a Wiley mill at 10 mesh, producing a light yellow granular material.

Example 10

Thermal Polymerization of 30:1 Molar Comonomer Mixture of L-Lysine Monohydrochloride and Maleic Acid Dried from Aqueous Solution Samples of 1 gram of the dried comonomer mixture prepared as above was weighed into 250-ml Pyrex™ dishes. The dishes were then placed in the convection oven, preheated to 220° C. under the nitrogen stream. The samples were polymerized for 5 hours and 7 hours. On cooling, the products were scraped, weighed, and collected in glass vials. The products were soluble. Stock solutions at 25 mg/ml were prepared. The products were obtained in high yield and exhibited good activity as coagulants of SAGD produced water.

Example 11

Thermal Polymerization of the Dry Comonomer Composition of L-Lysine Monohydrochloride and Maleic Acid. 30:1 Molar Ratio, Under Vacuum The comonomer composition and reaction conditions as above were employed except that the reaction was run under a vacuum of ~30 inches of Hg rather than under a slight positive pressure of the nitrogen stream. After 5 hours at 220° C., the dishes were removed and products collected in 20 ml glass vials. The product was partially a soluble polymer and partially a gelling polymer. The solution was micro-centrifuged to separate the phases, and the soluble supernatant was dried and then rehydrated to form a 50 mg/ml stock solution. It demonstrated coagulation activity of SAGD produced water at 100 ppm.

Example 12

Minimization of Water Usage in Preparation of the Dry Comonomer Composition of Lysine and Maleic Acid, 30:1 Molar Ratio, at Room Temperature To produce a good polymeric coagulant from the comonomeric mixture of lysine and maleic acid, it is advantageous to prepare an intimate comonomeric composition. At room temperature, it is possible to prepare a 50% by weight solution of lysine in water. Maleic anhydride may be added to the water in the appropriate ratio. Then, the entire solution may be dried to form the comonomeric composition.

The purpose of the experiments in this example was to determine if a lesser amount of water could be used to prepare a slurry of the dry granules of lysine. The maleic anhydride was first dissolved in the water. Aqueous slurries at 30, 35, 40, 45 and 50% by weight water relative to the weight of lysine were prepared. For example, samples of 10 g of lysine HCl (55 mmoles) were added to maleic-in-water solutions of 3, 3.5, 4, 4.5, and 5 g. These were prepared by pipetting 1.8 mmols of maleic anhydride (Aldrich) melt (90° C.) into 3, 3.5, 4, 4.5 or 5 g of distilled water (40%, 45% or 50% water by weight of the lysine). The maleic solutions were then dripped into dry lysine and stirred by hand until the mixture was homogenous. These comonomeric compositions were dried overnight at 90° C. Next, duplicate 1.5 g samples of each were weighed into 250 ml Pyrex™ dishes and placed in the convection oven at 220° C. with continuous nitrogen stream for 5 and 7 hours. When complete, the products were weighed and placed in 20 ml glass vials. Stock solutions at 50 mg/ml were prepared for coagulation assays.

The products prepared from the 40, 45, and 50% water-relative-to-lysine comonomeric compositions exhibited good activity as coagulants of produced water from a SAGD operation at 100 to 125 ppm. These materials appeared to be well slurried when stirred with the maleic in water. It was possible to improve the products of the thermal polymerization of the 40, 45, and 50% water-relative-to-lysine comonomeric compositions of example 12 if they were subjected to manual grinding when wet using a mortar and pestle. Improved activity as coagulants was observed at 75 ppm.

The products prepared from the 30 and 35% water-relative-to-lysine comonomeric compositions did not function so well as coagulants. Nor did the comonomeric mixtures when wet appear to be homogeneously slurried and mixed with the water. These materials when wet had noticeable amounts of relatively dry and unmixed lysine granules. Consequently, when subjected to thermal treatment, these granules would not be expected to polymerize well. More thorough mixing of the wet comonomeric compositions of these treatments via use of the mortar and pestle did not result in significant improvements in the coagulation activity of their polymerized products.

Example 13

Minimization of Water Usage in Preparation of the Dry Comonomer Composition of Lysine and Maleic Acid, 30:1 Molar Ratio, at Elevated Temperatures The solubility of lysine in water and water-plus-maleic solution increases significantly with temperature. The solubilities of lysine were essentially the same with and without the maleic acid added to the water. For example, samples of lysine HCl were added to water in sealed, glass bottles, shaken, and placed in the forced-air oven at various temperatures. These were manually shaken periodically over the next few hours, then left to dissolve overnight. At 60° C., complete solutions of lysine in water were observed at up to 58% lysine by weight. At 70° C., the lysine completely dissolved to 60%; at 80° C. to 62%; at 90° C. to 64%; at 100° C. to 66% lysine by weight in water. At 120° C. in water, now under pressure, lysine was observed to completely dissolve up to 70% by weight. Representative samples of these materials were dried and polymerized at 220° C., 5 to 7 hours, under nitrogen. Coagulants exhibiting good activity were produced in each case.

Example 14

Synergistic Formulas of Lysine Copolymers with Polymers of Diallyl Dimethyl Ammonium Chloride (polyDADMAC), Epichlorohydrin/Dimethylamine (polyEpi/DMA) and Aluminum Chlorohydrate (Polyaluminate) Used as Coagulants Dry blends comprised of lysine copolymers and conventional, commercial polymer coagulants were prepared. For example, the copolymer of lysine and maleic acid formed from the 30:1 molar, comonomeric composition and polymerized for 5 hours at 220° C. under a nitrogen blanket was used. It was blended dry with polyDADMAC (SNF Floquat™ TS45), polyEpi/DMA (SNF FL 2749), or polyaluminate (Kemira PAX 18). (The latter two materials are commercially supplied as solutions; they were dried overnight at 90° C. to provide dried material for blending.) Dry weight ratios examined included 1:1, 2:1, 3:1, and 4:1 lysine copolymer:conventional coagulants. Stock solutions at 25 mg total actives per ml of the blends were prepared along with stock solutions of the individual coagulants. Samples of SAGD produced water were prepared in vials as described previously and preheated at 90° C.

Dosing was selected such that coagulation was not detected in vials when the individual coagulants were added. For example, typically the conventional coagulants were dosed at 50 ppm with no observable coagulation. Similarly, the lysine copolymer was dosed at 50 ppm, again without exhibiting coagulation of the produced water. However, the 4:1 by weight polymer blends of lysine copolymer plus either polyDADMAC or polyEpi/DMA exhibited excellent coagulation at 50 ppm. The blends of lysine copolymer and polyaluminate did not exhibit this synergism.

Following coagulation, either anionic flocculant (e.g., SNF 923SH) or cationic flocculant (e.g., SNF 4490SH) were added to demonstrate flocculation of the coagulated particulates and further clarification of the produced water. The synergistic blends of the coagulants along with the cationic flocculants exhibited excellent flocculation of the produced water. These blends along with anionic flocculants were not very effective, particularly with higher content of the lysine copolymer coagulants. The coagulated solids water tended to become more dispersed in the produced water rather than flocculated when the lysine copolymer was combined with the anionic flocculants.

The invention claimed is:
1. A copolymer of (i) lysine with (ii) a diacid HOOC—R—COOH, or a corresponding anhydride, wherein:
R is a 2- to 4-carbon alkanyl or monoalkenyl chain,
the copolymer has a backbone containing:
(i) lysine residues;
(ii) diacid residues having the structure —(OC—R—CO)—, wherein OC and CO are carbonyl groups, or the corresponding anhydride of the diacid;
the molar ratio of the lysine residues to diacid residues or the corresponding anhydride residues in the copolymer, designated m:n, is about 10:1 to 100:1, and
the copolymer has a molecular weight of at least 50 kDa as determinable by gel electrophoresis using polylysine standards.
2. The copolymer of claim 1, wherein the diacid is selected from the group consisting of maleic acid, fumaric acid, succinic acid, glutaric acid, and adipic acid.
3. The copolymer of claim 1, wherein the diacid is maleic acid.
4. The copolymer of claim 1, wherein m:n is 10:1 to 50:1.
5. The copolymer of claim 1, wherein m:n is about 30:1.
6. The copolymer of claim 3, wherein m:n is about 30:1.
7. A composition comprising (a) the copolymer of claim 1, and (b) a polycationic coagulant selected from the group consisting of polyDADMAC (homopolymer of diallyl dimethyl ammonium chloride), polyEpi/DMA (copolymer of epichlorohydrin/dimethyl amine), and combinations thereof; wherein the weight ratio of (a):(b) is from about 10:1 to about 1:4.
8. The composition of claim 7, wherein the diacid is maleic acid.
9. The composition of claim 8, wherein the weight ratio of (a):(b) is about 4:1.
10. The composition of claim 8, which comprises a dry blend of (a) and (b).
11. The composition of claim 8, further comprising (c) a flocculant, wherein said flocculant comprises an acrylamide copolymer having a molecular weight of at least four million Daltons.
12. The composition of claim 11, wherein said acrylamide copolymer is a cationic acrylamide copolymer.
13. The composition of claim 11, wherein said flocculant further comprises a heat-activated or pregelatinized starch having flocculating activity.
14. The composition of claim 11, which comprises a dry blend of (a), (b) and (c).
15. The composition of claim 11, wherein said flocculant is an emulsion.
16. A method of producing coagulation in wastewater containing emulsified and/or suspended oils and/or solids, comprising: treating said wastewater with a coagulant comprising the copolymer of claim 1.

\* \* \* \* \*